United States Patent
Chono et al.

(10) Patent No.: US 9,521,433 B2
(45) Date of Patent: Dec. 13, 2016

(54) VIDEO ENCODING DEVICE, VIDEO DECODING DEVICE, VIDEO ENCODING METHOD, VIDEO DECODING METHOD, VIDEO ENCODING OR DECODING PROGRAM

(75) Inventors: Keiichi Chono, Tokyo (JP); Yoshihiro Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 771 days.

(21) Appl. No.: 12/676,207

(22) PCT Filed: Sep. 5, 2008

(86) PCT No.: PCT/JP2008/066067
§ 371 (c)(1),
(2), (4) Date: Mar. 3, 2010

(87) PCT Pub. No.: WO2009/031648
PCT Pub. Date: Mar. 12, 2009

(65) Prior Publication Data
US 2010/0177820 A1    Jul. 15, 2010

(30) Foreign Application Priority Data

Sep. 6, 2007  (JP) .................................. 2007-231478

(51) Int. Cl.
*H04N 11/04* (2006.01)
*H04N 19/93* (2014.01)
(Continued)

(52) U.S. Cl.
CPC ............ *H04N 19/93* (2014.11); *H04N 19/136* (2014.11); *H04N 19/196* (2014.11); *H04N 19/21* (2014.11); *H04N 19/91* (2014.11)

(58) Field of Classification Search
None
See application file for complete search history.

(56) References Cited

U.S. PATENT DOCUMENTS

2007/0009047 A1*  1/2007  Shim et al. .............. 375/240.26
2007/0194953 A1   8/2007  Cho
(Continued)

FOREIGN PATENT DOCUMENTS

JP  2004135251 A  4/2004
JP  2005223533 A  8/2005
(Continued)

OTHER PUBLICATIONS

"Text of ISO/IEC 14496-10 Advanced Video Coding 3rd Edition", ITU Study Group 16—Video Coding Experts Group—ISO/IEC MPEG & ITU-T VCEG(ISO/IEC JTC1/SC29/WG11 and ITU-T SG16 Q6), XX, XX, No. N6540, Oct. 1, 2004, pp. 185-240.*
(Continued)

*Primary Examiner* — James M Anderson, II

(57) ABSTRACT

Intended is to obtain a video encoding device, a video encoding method, and a video encoding program which enable to prevent reduction in compression efficiency caused by drastic changes in symbol occurrence probabilities in context adaptive coding, and a video decoding device, a video decoding method and a decoding program corresponding thereto.

The video data 101 is input into video encoding device on a macroblock basis, and after quantization, the PCM determination unit 139 determines whether the coded data 123 is PCM mode or not. Even when the coded data 123 is PCM mode, the context updating unit 301 executes context updating processing so as to improve efficiency of binary arithmetic coding. According to the determination of PCM mode or non PCM mode, the third switch 148 supplies either binary arithmetic coding output or PCM coding output as its output data.

14 Claims, 18 Drawing Sheets

(51) Int. Cl.
*H04N 19/196* (2014.01)
*H04N 19/91* (2014.01)
*H04N 19/136* (2014.01)
*H04N 19/21* (2014.01)

(56) References Cited

U.S. PATENT DOCUMENTS

2008/0240233 A1* 10/2008 Au et al. ................. 375/240.02
2009/0279604 A1   11/2009 Chono et al.

FOREIGN PATENT DOCUMENTS

| KR | 10-2007-0006445 A | 1/2007 |
| WO | 2007/027402 A2 | 3/2007 |
| WO | 20070043609 A | 4/2007 |

OTHER PUBLICATIONS

International Search Report for PCT/JP2008/066067 mailed Dec. 9, 2008.
Supplementary European Search Report for EP 08 82 9169 dated Feb. 16, 2011.
"Text of ISO/EC 14496-10 Advanced Video Coding 3rd Edition", ITU Study Group 16—Video Coding Experts Group—ISO/EC MPEG & ITU-T VCEG(ISO/IEC JTC1/SC29/WG11 and ITU-T SGI6 06), XP002620324, Oct. 1, 2004, pp. 185-240.
D. Marpe et al., "Context-Based Adaptive Binary Arithmetic Coding in the H.2641/AVC Video Compression Standard", IEEE Transactions on Circuits and Systems for Video Technology, vol. 13, No. 7, Jul. 2003, pp. 620-636.
Korean Office Action for KR10-2010-7007514 issued Aug. 9, 2011.
The Extended European Search Report for EP Application No. EP08829169.5 dated on Jan. 9, 2015.

* cited by examiner

FIG. 2

HORIZONTAL COMPONENT u →

VERTICAL COMPONENT v ↓

| 6 | −3 | 0 | 0 |
| 1 | 0 | 0 | 0 |
| 0 | 0 | 0 | 0 |
| 0 | 1 | 0 | 0 |

FIG. 3

HORIZONTAL COMPONENT u →

VERTICAL COMPONENT v ↓

| SCAN NUMBER | sig | last | level_minus1 | sign |
|---|---|---|---|---|
| 0 | 1 | 0 | 5 | 0 |
| 1 | 1 | 0 | 2 | 1 |
| 2 | 1 | 0 | 0 | 0 |
| 3 | 0 | — | — | — |
| 4 | 0 | — | — | — |
| 5 | 0 | — | — | — |
| 6 | 0 | — | — | — |
| 7 | 0 | — | — | — |
| 8 | 0 | — | — | — |
| 9 | 0 | — | — | — |
| 10 | 1 | 1 | 0 | 0 |
| 11 | — | — | — | — |
| 12 | — | — | — | — |
| 13 | — | — | — | — |
| 14 | — | — | — | — |
| 15 | — | — | — | — |

FIG. 5

| level_minus1 | BINARY STRING | | | | | | | | | | | | | | | | | | | | |
|---|---|---|---|---|---|---|---|---|---|---|---|---|---|---|---|---|---|---|---|---|---|
| 0 | 0 | | | | | | | | | | | | | | | | | | | | |
| 1 | 1 | 0 | | | | | | | | | | | | | | | | | | | |
| 2 | 1 | 1 | 0 | | | | | | | | | | | | | | | | | | |
| 3 | 1 | 1 | 1 | 0 | | | | | | | | | | | | | | | | | |
| 4 | 1 | 1 | 1 | 1 | 0 | | | | | | | | | | | | | | | | |
| 5 | 1 | 1 | 1 | 1 | 1 | 0 | | | | | | | | | | | | | | | |
| 6 | 1 | 1 | 1 | 1 | 1 | 1 | 0 | | | | | | | | | | | | | | |
| 7 | 1 | 1 | 1 | 1 | 1 | 1 | 1 | 0 | | | | | | | | | | | | | |
| 8 | 1 | 1 | 1 | 1 | 1 | 1 | 1 | 1 | 0 | | | | | | | | | | | | |
| 9 | 1 | 1 | 1 | 1 | 1 | 1 | 1 | 1 | 1 | 0 | | | | | | | | | | | |
| 10 | 1 | 1 | 1 | 1 | 1 | 1 | 1 | 1 | 1 | 1 | 0 | | | | | | | | | | |
| 11 | 1 | 1 | 1 | 1 | 1 | 1 | 1 | 1 | 1 | 1 | 1 | 0 | | | | | | | | | |
| 12 | 1 | 1 | 1 | 1 | 1 | 1 | 1 | 1 | 1 | 1 | 1 | 1 | 0 | | | | | | | | |
| 13 | 1 | 1 | 1 | 1 | 1 | 1 | 1 | 1 | 1 | 1 | 1 | 1 | 1 | 0 | | | | | | | |
| 14 | 1 | 1 | 1 | 1 | 1 | 1 | 1 | 1 | 1 | 1 | 1 | 1 | 1 | 1 | 0 | | | | | | |
| 15 | 1 | 1 | 1 | 1 | 1 | 1 | 1 | 1 | 1 | 1 | 1 | 1 | 1 | 1 | 1 | 0 | | | | | |
| 16 | 1 | 1 | 1 | 1 | 1 | 1 | 1 | 1 | 1 | 1 | 1 | 1 | 1 | 1 | 1 | 0 | 1 | 0 | | | |
| 17 | 1 | 1 | 1 | 1 | 1 | 1 | 1 | 1 | 1 | 1 | 1 | 1 | 1 | 1 | 1 | 1 | 0 | 0 | 1 | | |
| 18 | 1 | 1 | 1 | 1 | 1 | 1 | 1 | 1 | 1 | 1 | 1 | 1 | 1 | 1 | 1 | 1 | 0 | 1 | 0 | | |
| 19 | 1 | 1 | 1 | 1 | 1 | 1 | 1 | 1 | 1 | 1 | 1 | 1 | 1 | 1 | 1 | 1 | 1 | 0 | 1 | 0 | |
| ... | | | | | | | | | | | | | | | | | | | | | ... |
| CONTEXT NUMBER | 0/1/2/3/4 | 5/6/7/8/9 | ↑ | ↑ | ↑ | ↑ | ↑ | ↑ | ↑ | ↑ | ↑ | ↑ | ↑ | ↑ | ↑ | eq | eq | eq | eq | eq | eq |

FIG. 6   (CONTEXT UPDATING PROCESSING)

FIG. 7

| pStateidx    | 0  | 1  | 2  | 3  | 4  | 5  | 6  | 7  | 8  | 9  | 10 | 11 | 12 | 13 | 14 | 15 |
|--------------|----|----|----|----|----|----|----|----|----|----|----|----|----|----|----|----|
| transIdxLPS  | 0  | 0  | 1  | 2  | 2  | 4  | 4  | 5  | 6  | 7  | 8  | 9  | 9  | 11 | 11 | 12 |
| transIdxMPS  | 1  | 2  | 3  | 4  | 5  | 6  | 7  | 8  | 9  | 10 | 11 | 12 | 13 | 14 | 15 | 16 |
| pStateidx    | 16 | 17 | 18 | 19 | 20 | 21 | 22 | 23 | 24 | 25 | 26 | 27 | 28 | 29 | 30 | 31 |
| transIdxLPS  | 13 | 13 | 15 | 15 | 16 | 16 | 18 | 18 | 19 | 19 | 21 | 21 | 22 | 22 | 23 | 24 |
| transIdxMPS  | 17 | 18 | 19 | 20 | 21 | 22 | 23 | 24 | 25 | 26 | 27 | 28 | 29 | 30 | 31 | 32 |
| pStateidx    | 32 | 33 | 34 | 35 | 36 | 37 | 38 | 39 | 40 | 41 | 42 | 43 | 44 | 45 | 46 | 47 |
| transIdxLPS  | 24 | 25 | 26 | 27 | 27 | 28 | 29 | 29 | 30 | 30 | 30 | 31 | 32 | 32 | 33 |
| transIdxMPS  | 33 | 34 | 35 | 36 | 37 | 38 | 39 | 40 | 41 | 42 | 43 | 44 | 45 | 46 | 47 | 48 |
| pStateidx    | 48 | 49 | 50 | 51 | 52 | 53 | 54 | 55 | 56 | 57 | 58 | 59 | 60 | 61 | 62 | 63 |
| transIdxLPS  | 33 | 34 | 35 | 35 | 35 | 36 | 36 | 36 | 37 | 37 | 37 | 38 | 38 | 38 |
| transIdxMPS  | 49 | 50 | 51 | 52 | 53 | 54 | 55 | 56 | 57 | 58 | 59 | 60 | 61 | 62 | 63 | 63 |

(STATE INDEX TRANSITION TABLE)

(CONTEXT EQUAL PROBABILITY UPDATING PROCESSING)

VIDEO ENCODING DEVICE, VIDEO DECODING DEVICE, VIDEO ENCODING METHOD, VIDEO DECODING METHOD, VIDEO ENCODING OR DECODING PROGRAM

INCORPORATION BY REFERENCE

This application is the National Phase of PCT/JP2008/066067, filed Sep. 5, 2008, which is based upon and claims the benefit of priority from Japanese patent application No. 2007-231478, filed on Sep. 6, 2007, the disclosure of which is incorporated herein in its entirety by reference.

TECHNICAL FIELD

The present invention relates to a video encoding device, a video decoding device, a video encoding method, a video decoding method, and a video encoding or decoding program which can be suitably used as a high image quality video encoding device or video decoding device for hi-vision broadcasting, for example, and more particularly, a video encoding device, a video decoding device, a video encoding method, a video decoding method and a video encoding or decoding program based on context adaptive arithmetic encoding.

BACKGROUND ART

Among video processing devices, a video encoding device is designed to generate a bit stream by encoding input-video data fed from an external device on the basis of a predetermined video encoding method. One of representative video encoding methods for use by a video encoding device is the H.264 standard. The H.264 standard is recommended by ITU (International Telecommunication Union) in May 2003, as one standard of motion video data compression coding methods.

Among H.264 based video coding methods, a joint model (JM) method is known as a reference model. A video encoding device adopting the joint model method is proposed as art related to the present invention (see e.g. Patent Literature 1). In the present specification, the proposed video encoding device will be referred to as a video encoding device as related art.

FIG. 17 shows a structure of the video encoding device as related art. A video encoding device 100 as related art comprises a prediction-transformation-quantization unit 102 which sequentially receives input of video data 101 as an input image, a PCM (Pulse Code Modulation) encoder 103, and a first switch 104; the video encoding device 100 operates on a macroblock basis.

A video signal format of the video data 101, which is fed into the video encoding device 100 shown in FIG. 17, is assumed to be QCIF (Quarter Common Intermediate Format). The QCIF is one of video signal formats determined by ITU.

FIG. 18 shows an image frame of the QCIF video signal format. The image frame is formed of horizontally 11 by vertically 9 macroblocks. One image frame is formed of one frame picture in a case of progressive scanning. In a case of interlaced scanning, it is formed of two field pictures. In the following description, these frame pictures will be simply referred to as "pictures".

A macroblock as a base unit forming a picture is formed of 16 by 16 luminance pixels and a pair of 8 by 8 chrominance pixels for Cr and Cb components. In the figure, with respect to 4 by 4 pixel blocks obtained by dividing a macroblock into 16 sub-blocks, a luminance position (x) and a chrominance position (o) are represented on a pixel basis. Each of macroblocks in a picture is encoded in the raster scan from upper left to lower right of the picture.

Back to FIG. 17, description will be made. The prediction-transformation-quantization unit 102 receives input of video data 101 and generates a prediction image from a decoded image 122 stored in a decoding picture buffer 121 to execute processing of subtracting the prediction image from the image data 101 as an input image on a macroblock basis. The input image is designed to, with frequency transform applied, be transformed from a space domain to a frequency domain, then quantized and output as coded data 123.

Here, the prediction-transformation-quantization unit 102 is designed to be supplied with a macroblock quantization parameter 126M by a rate controller 125. At the prediction-transformation-quantization unit 102, transformed coefficients obtained by applying frequency transform to the input image will be quantized by a quantization step size corresponding to the macroblock quantization parameter 126M.

In the present specification, the above-described transformed and quantized coefficients of the input image obtained at the prediction-transformation-quantization unit 102 will be referred to as "level values". The "level values" corresponds to "transformed and quantized values" in the scope of claims.

The rate controller 125 monitors a bit stream 128 output from the video encoding device 100 according to the related art by a multiplexer 127. Then, it controls the quantization parameter 126 so as to adjust the number of bits of the bit stream 128 to a target number of bits. More specifically, when the current number of bits is larger than the target number of bits, calculate the quantization parameter 126 which makes the quantization step size be large and conversely when the current number of bits is smaller than the target number of bits, calculate the quantization parameter 126 which makes the quantization step size be small.

Thus calculated quantization parameter 126 is output as a slice quantization parameter 126S at a head of a unit of a set of macroblocks called slice. The quantization parameter 126 will be also output as the macroblock quantization parameter 126M at the head of the macroblocks.

Among them, the slice quantization parameter 126S is designed to be supplied to the multiplexer 127, as well as to a context initial value calculator 129. A model ID (model_id) 131 supplied from a model calculator not shown which is disposed outside the video encoding device 100 as related art is designed to be also similarly supplied to the multiplexer 127, as well as to the context initial value calculator 129.

The context initial value calculator 129 calculates an initial value of a context for binary arithmetic coding based on the slice quantization parameter 126S supplied from the rate controller 125 and the model ID 131 supplied from the external model calculator. Then, set an initial value 132 of the context at a memory 133.

The slice quantization parameter 126S corresponds to a sum of the addition of "26" to "slice_qp_delta" of "Slice header syntax" in the section 7.3.3 in the above-described "ITU-T H.264 | ISO/IEC 14496-10 Advanced Video Coding" and "pic_int_qp_minus26" of "Picture parameter set RBSP syntax" in the same section 7.3.3. The model ID 131 also corresponds to "cabac_init_idc" in "Slice header syntax" in the same section 7.3.3.

Context is a pair of a most-probable-symbol (MPS) and a least-probable-symbol (LPS) occurrence probability state index (pStateidx) for a binary symbol which will be described later. In the binary arithmetic coding, a relationship expressed by the following expression (1) holds.

$$MPS=1-LPS \qquad (1)$$

In the H.264 standard of the video encoding system, the number of "pStateidx" of a context is 64. In the binary arithmetic coding processing, a least-probable-symbol occurrence probability (rLPS) corresponding to the "pStateidx" is set on the basis of a look-up table. Details thereof are recited in "9.3 CABAC parsing process for slice data" in the above-described "ITU-T H.264 | ISO/IEC 14496-10 Advanced Video Coding".

The coded data 123 output from the prediction-transform-quantization unit 102 is supplied to a binarization unit 135. The coded data 123 here is formed of a prediction parameter related to generation of an predication image, a macroblock quantization parameter, and transformed and quantized coefficients (or transformed and quantized values).

The description will be supplemented. Strictly expressed, a difference value which is obtained by subtracting, from a macroblock quantization parameter, a macroblock quantization parameter of an immediately preceding macroblock, is supplied as coded data to the binarization unit 135. Whether a value of a quantization parameter is binarized as it is or a difference value is binarized is not so crucial to the present invention. The description has been therefore made assuming that the coded data 123 such as a macroblock quantization parameter is supplied to the binarization unit 135.

On the other hand, the above-described level values 136 output from the prediction-transform-quantization unit 102 are supplied to a local decoder 137. The local decoder 137 inverse-quantizes the level values 136. Then, by applying inverse-frequency-transform, it restores the level values 136 to an image in the original space domain. It will, however, be non-reversible restoration due to effect of quantization of the prediction-transform-quantization unit 102 in general. Finally, the local decoder 137 calculates a local decoded image 138 by adding a prediction image supplied from the prediction-transform-quantization unit 102 to the above-described image returned to the original space domain. The local decoded image 138 is supplied to the first switch 104. The binarization unit 135 having received a supply of the coded data 123 converts the image into a binary string according to a procedure determined by the H.264 standard to sequentially output each bit of the binary string. In the following description, each bit of the binary string will be referred to as a binary symbol (bin). Details of the binary string conversion executed by the binarization unit 135 are disclosed in "CABAC parsing process for slice data" in the section 9.3 in "ITU-T H.264 | ISO/IEC 14496-10 Advanced Video Coding".

A PCM determination unit 139 is designed to monitor the coded data 123 supplied to the binarization unit 135. Then, determine whether the number of bins corresponding to coded data of one macroblock exceeds a predetermined and fixed number of bins. Monitoring the coded data 123 supplied to the binarization unit 135 is equivalent to monitoring the number of bins 142 to be input to a binary arithmetic encoder 141 connected to the output side of the binarization unit 135. The number of bins 142 is the number of bins in a case where the number of bits obtained by subjecting the number of bins corresponding to the coded data 123 of one macroblock described above to binary arithmetic coding exceeds the number of bits of one uncompressed macroblock.

In the present specification, the number of bits equivalent to input one uncompressed macroblock will be referred to as a predetermined number of bits. In the H.264 standard, when input video data is 4:2:0, its predetermined number of bits is 3200 bits.

When the number of bins corresponding to the coded data 123 of one macroblock does not exceed the predetermined number of bins as a result of monitoring, the PCM determination unit 139 outputs PCM-mode non-selection as a control signal 144. On the other hand, when the number of bins corresponding to the coded data 123 of one macroblock exceeds the predetermined number of bins, output PCM-mode selection as the control signal 144.

The control signal 144 is supplied to the first switch 104, the binary arithmetic encoder 141, a context modeling unit 146, and second and third switches 147 and 148. Among them, the binary arithmetic encoder 141 operates differently when a PCM-mode selection is signaled by the control signal 144 and when PCM-mode non-selection is signaled.

First, when the PCM mode selection is signaled by the control signal 144, the binary arithmetic encoder 141 outputs data 153 to a first buffer 151 among the first buffer 151 and a second buffer 152 connected to the unit. More specifically, first, it subjects bins of the prediction parameter corresponding to the PCM mode to binary arithmetic coding based on a context 154 supplied from the context modeling unit 146. Next, it flushes the current range of the binary arithmetic encoder 141 and output the same to the first buffer 151. Finally, by outputting as many bits of "0" as required, bit strings output to the first buffer 151 are aligned. Since bins of the prediction parameter corresponding to the PCM mode are values uniquely determined, the binary arithmetic encoder 141 by itself generates the bins to execute binary arithmetic coding.

On the other hand, when the PCM-mode non-selection is signaled by the control signal 144, the binary arithmetic encoder 141 executes output to the second buffer 152. The binary arithmetic encoder 141 subjects the bin 142 sequentially supplied from the binarization unit 135 to binary arithmetic coding based on the context 154 supplied from the context modeling unit 146. Then, it writes out its bit output 156 in the second buffer 152.

By the above-described binary arithmetic coding by the binary arithmetic encoder 141, the context 154 supplied by the context modeling unit 146 will be sequentially updated according to the bin 142 as a target of binary arithmetic coding. Roughly expressed, when a most-probable-symbol (MPS) is equal to a bin in the H.264 standard, it updates least-probable-symbol occurrence probability state indexes (pStateidx) such that the least-probable-symbol occurrence probabilities (rLPS) are decreased. When a most-probable-symbol (MPS) is not equal to a bin in the H.264 standard, update least-probable-symbol occurrence probability state indexes (pStateidx) such that least-probable-symbol occurrence probabilities (rLPS) are increased. When a most-probable-symbol (MPS) is not equal to a bin and least-probable-symbol occurrence probability state indexes (pStateidx) is "0", that is, when a least-probable-symbol occurrence probability (rLPS) is the largest, invert the most-probable-symbol (MPS). Details of this point are recited in "9.3 CABAC parsing process for slice data" in "ITU-T H.264 | ISO/IEC 14496-10 Advanced Video Coding".

Thus, by updating (learning) each context 154 according to input bins, the binary arithmetic encoder 141 enables entropy coding which meets occurrence probabilities of the input bins.

The context modeling unit 146 sequentially reads the context 154 corresponding to the bin 142 supplied to the binary arithmetic encoder 141 from the memory 133. Then, the context 154 is supplied to the binary arithmetic encoder 141 and the context learned by the binary arithmetic encoder 141 is stored in the memory 133.

On the other hand, the PCM encoder 103 receives input of the video data 101 on a macroblock basis and makes a pixel value of the input macroblock into a PCM code (non-entropy code). This PCM coding output 157 is output to a third buffer 158.

The number of bits of PCM coding with respect to one macroblock, with its pixel value as 8 bits, will be a product of 384 (pixels) and 8 bits, 3072 bits. Strictly speaking, the number of header bits for designating PCM coding is added to 3072 bits, whose total number of bits will be not more than the above-described predetermined number of bits. In addition, as to the number of header bits, the number of bits for 8 bins in a B slice in the H.264 standard will be a maximum value.

When the PCM mode selection is signaled by the control signal 144, the first switch 104 supplies the decoding picture buffer 121 with the video data 101 as an input image. On the other hand, when the PCM-mode non-selection is signaled by the control signal 144, the first switch 104 selects the local decoded image 138 output from the local decoder 137 and supplies the decoding picture buffer 121 with the same. The decoding picture buffer 121 will store an image input through the first switch 104 as a decoded image for the following coding.

Only when the PCM-mode selection is signaled by the control signal 144, the second switch 147 supplies the multiplexer 127 with output data 161 of the first buffer 151. In other words, when the PCM-mode non-selection is signaled by the control signal 144, the output data 161 of the first buffer 151 is not supplied to the multiplexer 127.

When the PCM-mode non-selection is signaled by the control signal 144, the third switch 148 supplies the multiplexer 127 with output data 162 of the second buffer 152. When the PCM-mode selection is signaled by the control signal 144, the multiplexer 127 will be supplied with output data 163 of the third buffer 158.

The multiplexer 127 multiplexes the slice quantization parameter 126S, the model ID (model_id) 131 supplied from an external model calculator and the output data 161 and either one of the output data 162 and 163 input through the second and the third switches 147 and 148, respectively, and outputs the obtained data as the bit stream 128.

Patent Literature 1: Japanese Patent Laying-Open No. 2004-135251 (paragraph 0005).

The video encoding device 100 as described in above enables binary arithmetic coding or PCM coding to be executed selectively on a macroblock basis. Accordingly, even when the number of bits of binary arithmetic coding with respect to coded data of a certain macroblock exceeds a predetermined number of bits, selecting PCM coding guarantees that the number of output bits of the macroblock is not more than the predetermined number of bits.

One reason why the number of bits of binary arithmetic coding with respect to coded data of a certain macroblock exceeds a predetermined number of bits is that symbol occurrence probabilities of contexts learned in the past macroblocks do not coincide with bin occurrence probabilities of the coded data of the current macroblock. More specifically, assume that in a certain macroblock, its symbol occurrence probabilities drastically change. In this case, the number of bits of binary arithmetic coding with respect to coded data of the macroblock exceeds the above-described predetermined number of bits, which is one factor that symbol occurrence probabilities and bin occurrence probabilities do not coincide with each other. More specifically, one example is a case where after successive macroblocks having significant level values only in highest frequency components of transformed and quantized coefficients are subjected to binary arithmetic coding and the subsequent macroblock having significant level values in all frequency components of transformed and quantized coefficients is input. Here, a signification level value represents a level having an absolute value larger than zero.

The video encoding device 100 as related art, when selecting PCM coding, is not possible to learn contexts related to level values. Therefore, assuming that a macroblock having significant level values in every frequency components of transformed and quantized coefficients is input and PCM coded, even when a macroblock having significant level values in every frequency components of transformed and quantized coefficients is again input thereafter, the contexts are not learned. As a result, it is impossible to realize efficient binary arithmetic coding with respect to a latter macroblock as well.

Thus, the video encoding device 100 as related art has a problem that coding efficiency is decreased due to drastic changes in symbol occurrence probabilities. While in the above description, consideration has been given to video coding, the same problem occurs at the time of decoded image data obtained when symbol occurrence probabilities have drastic changes.

Under these circumstances, an object of the present invention is to provide a video encoding device, a video encoding method, and a video encoding program which prevent decrease in a compression efficiency caused by drastic changes in symbol occurrence probabilities in context adaptive coding, and their corresponding video decoding device, video decoding method and decoding program.

SUMMARY

A video encoding device according to an exemplary aspect of the invention includes a first encoding unit for subjecting transformed and quantized values which are obtained by applying frequency-transform and quantization to an image block to binary arithmetic coding based on contexts, a second encoding unit for encoding the image block by an encoding method different from the method of the first encoding unit, an output data selection unit for selecting either first output data output by the first encoding unit or second output data output by the second encoding unit, and a context updating unit for, when the output data selection unit selects the second output data, updating contexts for use in the binary arithmetic coding of the transformed and quantized values.

More specifically, according to the present invention, with the provision of a first encoding unit for subjecting, to binary arithmetic coding based on contexts, transformed and quantized values which are obtained by applying frequency-transform and quantization to an image block and a second encoding unit for executing the other encoding, when an output data selection unit selects second output data, contexts are updated which are for use in binary arithmetic coding of transformed and quantized values. This avoids reduction in coding efficiency originated from drastic changes in symbol occurrence probabilities.

A video decoding device according to an exemplary aspect of the invention includes a first decoding unit for subjecting input image data to binary arithmetic decoding based on contexts to decode transformed and quantized values, a second decoding unit for decoding the input image data by a decoding method different from the method of the first decoding unit, a decoding selection unit for selecting either the first decoding unit or the second decoding unit for decoding the input image data, and a context updating unit for, when the decoding selection unit selects decoding by the second decoding unit, updating contexts for use in the binary arithmetic decoding of the transformed and quantized values.

More specifically, according to the present invention, with the provision of a first decoding unit for subjecting input image data to binary arithmetic decoding based on contexts to decode transformed and quantized values and a second decoding unit for executing the other decoding, when a decoding selection unit selects decoding by using the second decoding unit, contexts is updated which is for use in binary arithmetic decoding of transformed and quantized values. When a macroblock is coded due to drastic changes in symbol occurrence probabilities, this enables a coded bit stream to be decoded while applying context updating which meets the changed symbol occurrence probabilities.

A video encoding method according to an exemplary aspect of the invention includes a first encoding step of subjecting transformed and quantized values which are obtained by applying frequency-transform and quantization to an image block to binary arithmetic coding based on contexts, a second encoding step of encoding the image block by an encoding method different from the method of the first encoding step, an output data selection step of selecting either first output data output at the first encoding step or second output data output at the second encoding step, and a context updating step of, when at the output data selection step, the second output data is selected, updating contexts for use in the binary arithmetic coding of the transformed and quantized values.

More specifically, according to the present invention, with the provision of a first encoding step of subjecting, to binary arithmetic coding based on contexts, transformed and quantized values which are obtained by applying frequency-transform and quantization to an image block and a second encoding step of executing the other encoding, when an output data selection step selects second output data, contexts are updated which are for use in binary arithmetic coding of transformed and quantized values. This avoids reduction in coding efficiency originated from drastic changes in symbol occurrence probabilities.

A video decoding method according to an exemplary aspect of the invention includes a first decoding step of subjecting input image data to binary arithmetic decoding based on contexts to decode transformed and quantized values, a second decoding step of decoding the input image data by a method different from the method of the first decoding step, a decoding selection step of selecting either the first decoding step or the second decoding step for decoding the input image data, and a context updating step of, when at the decoding selection step, decoding by the second decoding step is selected, updating contexts for use in the binary arithmetic decoding of the transformed and quantized values.

More specifically, according to the present invention, with the provision of a first decoding step of subjecting input image data to binary arithmetic decoding based on contexts to decode transformed and quantized values and a second decoding step of executing the other decoding, when a decoding selection step selects decoding by using the second decoding step, contexts are updated which are for use in binary arithmetic decoding of transformed and quantized values. When a macroblock is coded due to drastic changes in symbol occurrence probabilities, this enables a coded bit stream to be decoded while applying context updating which meets the changed symbol occurrence probabilities.

A video encoding program according to an exemplary aspect of the invention includes, which causes a computer to execute a first encoding processing of subjecting transformed and quantized values which are obtained by applying frequency-transform and quantization to an image block to binary arithmetic coding based on contexts, a second encoding processing of encoding the image block by an encoding method different from the method of the first encoding processing, an output data selection processing of selecting either first output data output by the first encoding processing or second output data output by the second encoding processing, and a context updating processing of, when in the output data selection processing, the second output data is selected, updating a context for use in the binary arithmetic coding of the transformed and quantized values.

More specifically, according to the present invention, with the provision, as a video encoding program to be executed by a computer, of first encoding processing of subjecting input image data to binary arithmetic coding based on contexts to encode transformed and quantized values and second encoding processing of executing the other encoding, when output data selection processing selects second output data, contexts are updated which are for use in binary arithmetic coding of transformed and quantized values. This avoids reduction in a coding efficiency which is originated from drastic changes in symbol occurrence probabilities.

A video decoding program according to an exemplary aspect of the invention includes, which causes a computer to execute a first decoding processing of subjecting input image data to binary arithmetic decoding based on contexts to decode transformed and quantized values, a second decoding processing of decoding the input image data by a decoding method different from the method of the first decoding processing, a decoding selection processing of selecting either the first decoding processing or the second decoding processing for decoding the input image data, and a context updating processing of, when in the decoding selection processing, decoding by the second decoding processing is selected, updating contexts for use in the binary arithmetic decoding of the transformed and quantized values.

More specifically, according to the present invention, as a video decoding program to be executed by a computer, with first decoding processing of subjecting input image data to binary arithmetic decoding based on contexts to decode transformed and quantized values and second decoding processing of executing the other decoding both set to be executable, when decoding selection processing selects decoding by using the second decoding processing, contexts are updated which are for use in binary arithmetic decoding of transformed and quantized values. When a macroblock is coded due to drastic changes in symbol occurrence probabilities this enables a coded bit stream to be decoded while applying context updating which meets the changed symbol occurrence probabilities.

As described in the foregoing, the present invention realizes video encoding and decoding which enable prevention of a reduction in compression efficiency caused by drastic changes in symbol occurrence probabilities.

BRIEF DESCRIPTION OF THE DRAWINGS

FIG. 2 is a diagram for use in explaining level values according to the first exemplary embodiment;

FIG. 3 is a diagram for use in explaining an order of frame scanning of level values shown in FIG. 2;

FIG. 4 is a diagram for use in explaining a result of calculation of level values shown in FIG. 2 according to a scanning order shown in FIG. 3;

FIG. 5 is a diagram for use in explaining one example of a binary string corresponding to "level_minus1";

FIG. 7 is a diagram for use in explaining contents of a state index transition table;

EXEMPLARY EMBODIMENT

Prior to description of exemplary embodiments of the present invention, principles of the present invention will be described. According to the present invention, when subjecting a macroblock to PCM coding due to drastic changes in symbol occurrence probabilities, contexts for symbols of coded data related to level values are updated before starting coding of a subsequent macroblock so as to coincide with the changed symbol occurrence probabilities. More specifically, set least-probable-symbol occurrence probability state indexes of contexts to be smaller than current index numbers.

Figure 19:
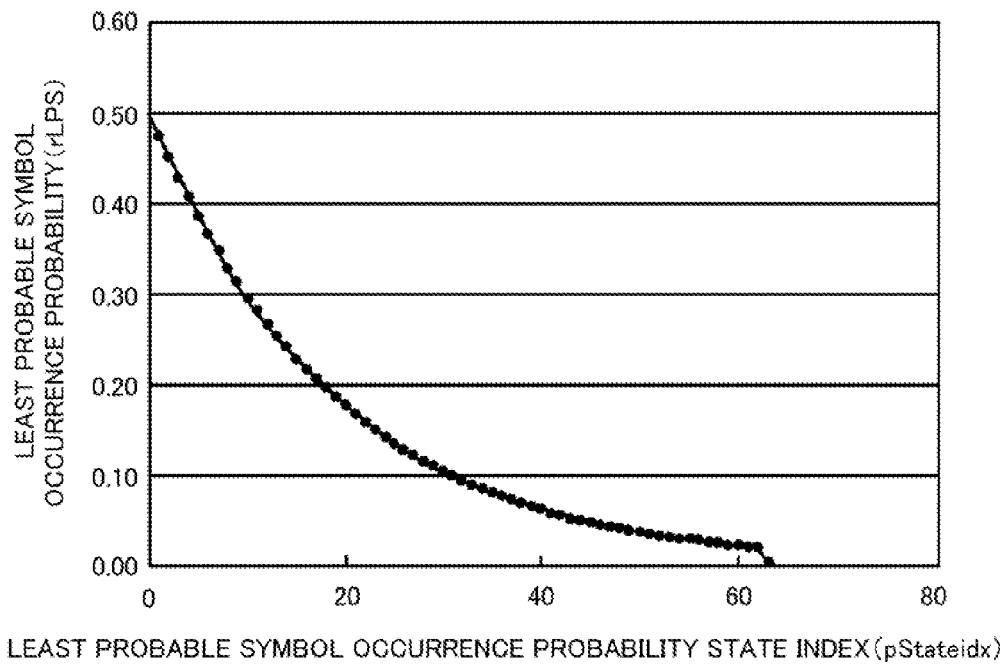
FIG. 19 is a characteristic diagram showing a relationship between least-probable-symbol occurrence probability state indexes and a least-probable-symbol occurrence probability.

FIG. 19 shows a relationship between least-probable-symbol occurrence probability state indexes and a least-probable-symbol occurrence probability. As can be seen in FIG. 19, updating least-probable-symbol occurrence probability state indexes (pStateidx) to be a smaller number is equivalent to increasing a least-probable-symbol occurrence probability (rLPS). In other words, increasing a least-probable-symbol occurrence probability is equivalent to decreasing a most-probable-symbol occurrence probability.

Moreover, according to a least-probable-symbol (LPS), least-probable-symbol occurrence probabilities (rLPS) will not be higher than a most-probable-symbol occurrence probability. Accordingly, these probabilities attaining an equal probability leads to the highest probability in least-probable-symbol occurrence probability. Therefore, in the present invention, at the time of PCM coding, update least-probable-symbol occurrence probabilities of contexts for symbols of coded data related to level values so as to approximate to an equal probability.

According to the present invention, contexts can be learned by updating contexts even in a case that after an input macroblock has significant level values in all frequency components and the PCM coding is applied another macroblock subsequently input also has significant level values in all frequency components. Therefore the subsequent input macroblock can be coded by binary arithmetic coding with a less number of bits than with that by PCM coding.

Figure 20:
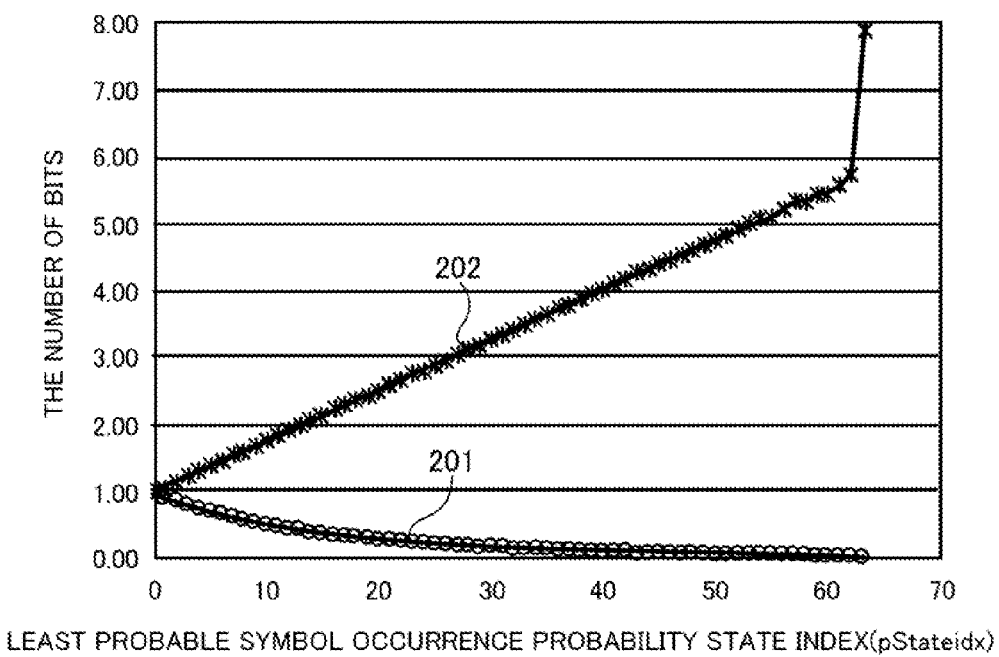
FIG. 20 is a characteristic diagram showing a relationship between least-probable-symbol occurrence probability state index and the number of bits.

FIG. 20 shows a relationship between the least-probable-symbol occurrence probability state index and the number of bits. In FIG. 20, a most-probable-symbol (MPS) is denoted by a curve 201 and a least-probable-symbol (LPS) is denoted by a curve 202. Updating (learning) the least-probable-symbol occurrence probability state index (pStateidx) to be a smaller number results in having a smaller number of bits even when the same LSP is input.

On the other hand, assume that after selecting PCM coding when a macroblock having significant level values in all frequency components is suddenly input and the subsequent macroblock having significant level values only in highest frequency components is input. Even in this case, since the number of symbols of the subsequent macroblock is small, coding is possible by binary arithmetic coding with a smaller number of bits than that of PCM coding while learning contexts.

(First Exemplary Embodiment)

Figure 1:
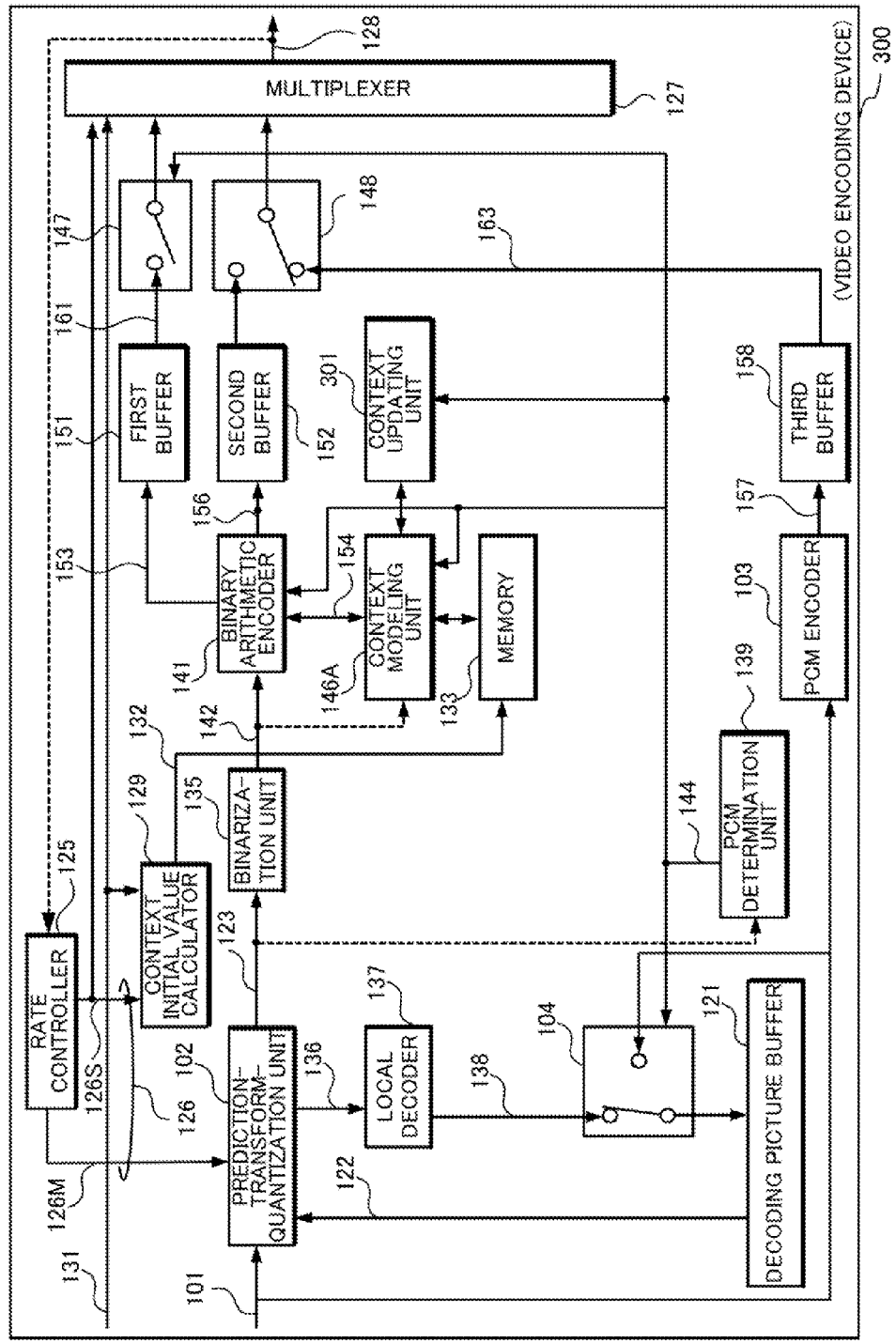
FIG. 1 is a block diagram showing a structure of a video encoding device according to a first exemplary embodiment of the present invention.
Figure 17:
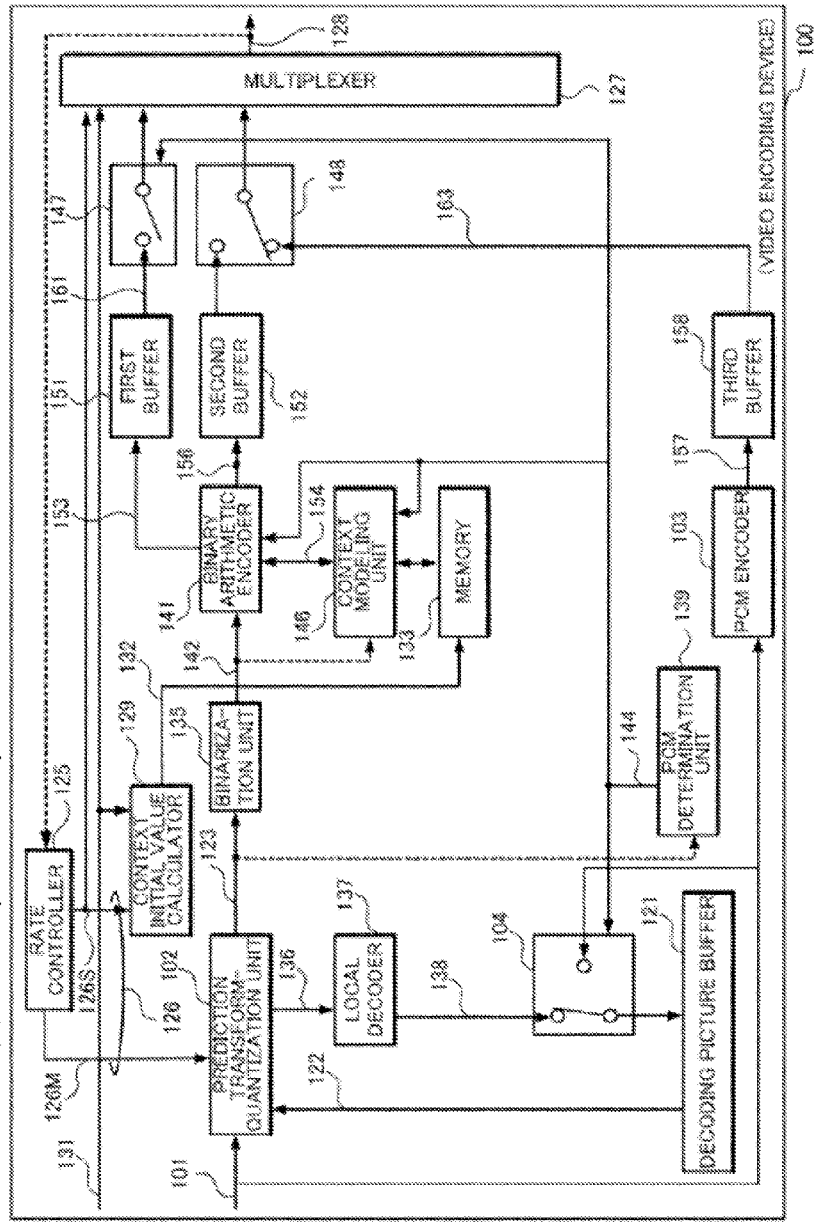
FIG. 17 is a block diagram showing a structure of a video encoding device as related art which is related to the present invention.

FIG. 1 is a diagram showing a structure of a video encoding device according to a first exemplary embodiment of the present invention. In a video encoding device 300 shown in FIG. 1, the same parts as those of FIG. 17 are allotted the same reference numerals, description of which parts are appropriately omitted. The video encoding device 300 has a structure with a context updating unit 301 newly provided in the video encoding device 100 according to the related art shown in FIG. 17. The context updating unit 301 is designed to receive input of the control signal 144 as a result of monitoring of the coded data 123 by the PCM determination unit 139. Then, when signaled by the control signal 144 that the PCM mode is selected by an excess of the number of bins corresponding to the coded data 123 of one macroblock over a predetermined number of bins as a result, the context updating unit 301 executes the processing of updating the contexts. In other words, upon receiving a signaling of the PCM mode selection, the context updating unit 301 updates contexts of the coded data related to level values stored in the memory 133 through a context modeling unit 146A.

Coded data related to level values in the present exemplary embodiment is "significant_coeff_flag,last_significant_coeff_flag, coef_abs_level_minus1" in the H.264 standard. Each of them will be described in the following.

Figure 18:
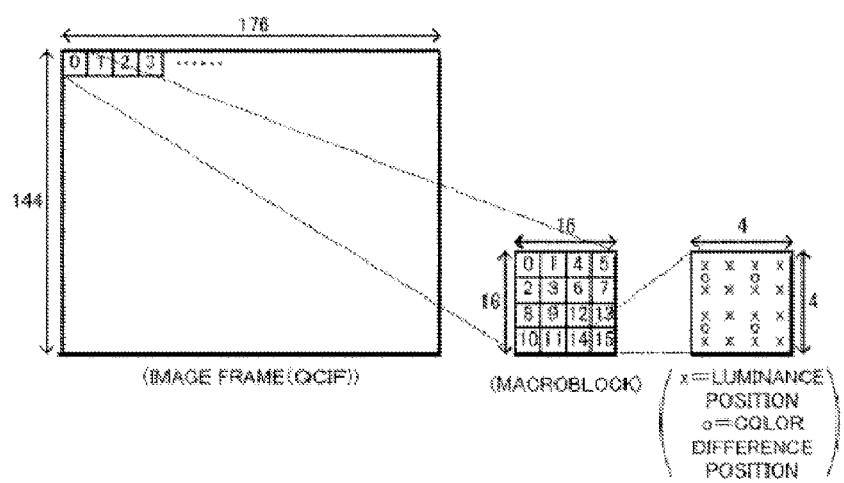
FIG. 18 is a diagram for use in explaining an image frame of a video format as QCIF.

A 4×4 block size frequency transform is used in the H.264 standard. With respect to each one macroblock forming the image frame shown in FIG. 18, in one 4×4 block, 16 level values each corresponding to each frequency component exist accordingly.

FIG. 2 shows an example of distribution of level values. With respect to a 4×4 block, a horizontal component is represented as u and a vertical component is represented as v. FIG. 3 shows an order of frame scanning of the level values shown in FIG. 2. In FIG. 3, "0" through "15" denote scan numbers.

According to the scanning order defined by the H.264 standard, in an ascending order of the scan numbers ($0 \le i \le 14$) excluding the highest frequency component "i=15", encode, as "significant_coeff_flag[i]", a flag indicating whether there exists a significant level value in the frequency component corresponding to the scan number "i". "i=0" is a direct current component (DC). In FIG. 2, "1" represents that a significant level value exists and "0" represents that no significant level value exists. Moreover, encode, as "last_signifcant_coeff_flag[i]", a flag indicating whether a significant level value of the frequency component corresponding to the scan number "i" is the last significant level value in the block or not. "1" indicates being the last significant level value in the block and "0" indicates being not the last significant level value in the block.

After executing the foregoing encoding, subsequently encode, as "coef_abs_level_minus1", a value obtained by subtracting "1" from an absolute value of a significant level value of a frequency component in which a significant level value exists in a descending order of the scan numbers ($0 \le i \le 5$). At this time, a code "sign" of the significant level value is also coded simultaneously.

FIG. 4 shows, as one example, a result of calculation of the level values shown in FIG. 2 according the scanning order shown in FIG. 3. Indicated here as "sig" is a column indicative of a calculation result with respect to "significant_coeff_flag" and indicated as "last" is a column indicative of a calculation result with respect to "last_significant_coeff_flag". In addition, a column indicative of a calculation result with respect to "coef_abs_level_minus1" is indicated as "level_minus1". The column indicative of a calculation result with respect to "sign (code ± of level values) is indicated as "sign" as it is. In the present specification, the simplified notation will be used hereafter. Parts indicated by "–" in the calculation results shown in FIG. 4 represent that the values are invalid.

As is clear from FIG. 4, "sig", "last" and "sign" are binary symbols (bins). Among them, bins of "sig" and "last" are subjected to binary arithmetic coding based on contexts corresponding to a scan number ($0 \le i \le 14$) excluding the highest frequency component. The context corresponding to "sig[i]" of the scan number "i" is assumed to be "context_sig[i]" and the context corresponding to "last[i]" is assumed to be "context_last[i]". Since "sign" is a code of ±, it is subjected to binary arithmetic coding by the equal probability as an occurrence probability without using a context.

On the other hand, "level_minus1" is converted into a binary string according to "UEGk binarization" of the H.264 standard. Details of "UEGk binarization" are recited in "9.3 CABAC parsing process for slice data" in the above-described "ITU-T H.264 | ISO/IEC 14496-10 Advanced Video Coding".

FIG. 5 shows one example of such a binary string as corresponds to "level_minus1". It can be found from FIG. 5 that in the first bin of the binary string of "level_minus1", binary arithmetic coding is executed based on five kinds of contexts from the context number "0" to "4". Also found is that from the second to the 14th, binary arithmetic coding is executed based on five kinds of contexts from the context number "5" to "9" as other five kinds of contexts. In FIG. 5, however, the symbol "←" is used for indicating in omission that third to 14th bins are subjected to binary arithmetic coding by a context set for the second bin of the binary string.

As to 15th and the following bins of the binary string of "level_minus1", no context is used to execute binary arithmetic coding with the equal probability as an occurrence probability. For indicating the foregoing, shown in FIG. 5 are the characters "eq" in the column of the context number. In the following description contexts for use in binary arithmetic coding of first to 14th bins of "level_minus1" will be denoted as "context_level[i] ($0 \le i \le 9$). Description related to the H.264 standard in relation with the present invention is once ended here.

The video encoding device 300 according to the first exemplary embodiment has a structure with the context updating unit 301 newly provided as described above and operation of other devices than the context updating unit 301 and its related devices is the same as that of the video encoding device 100 as related art shown in FIG. 17. Therefore, operation of the context updating unit 301 to be executed when PCM is selected will be described next and description of operation of a part overlapping with the video encoding device 100 as related art will be omitted.

Figure 6:
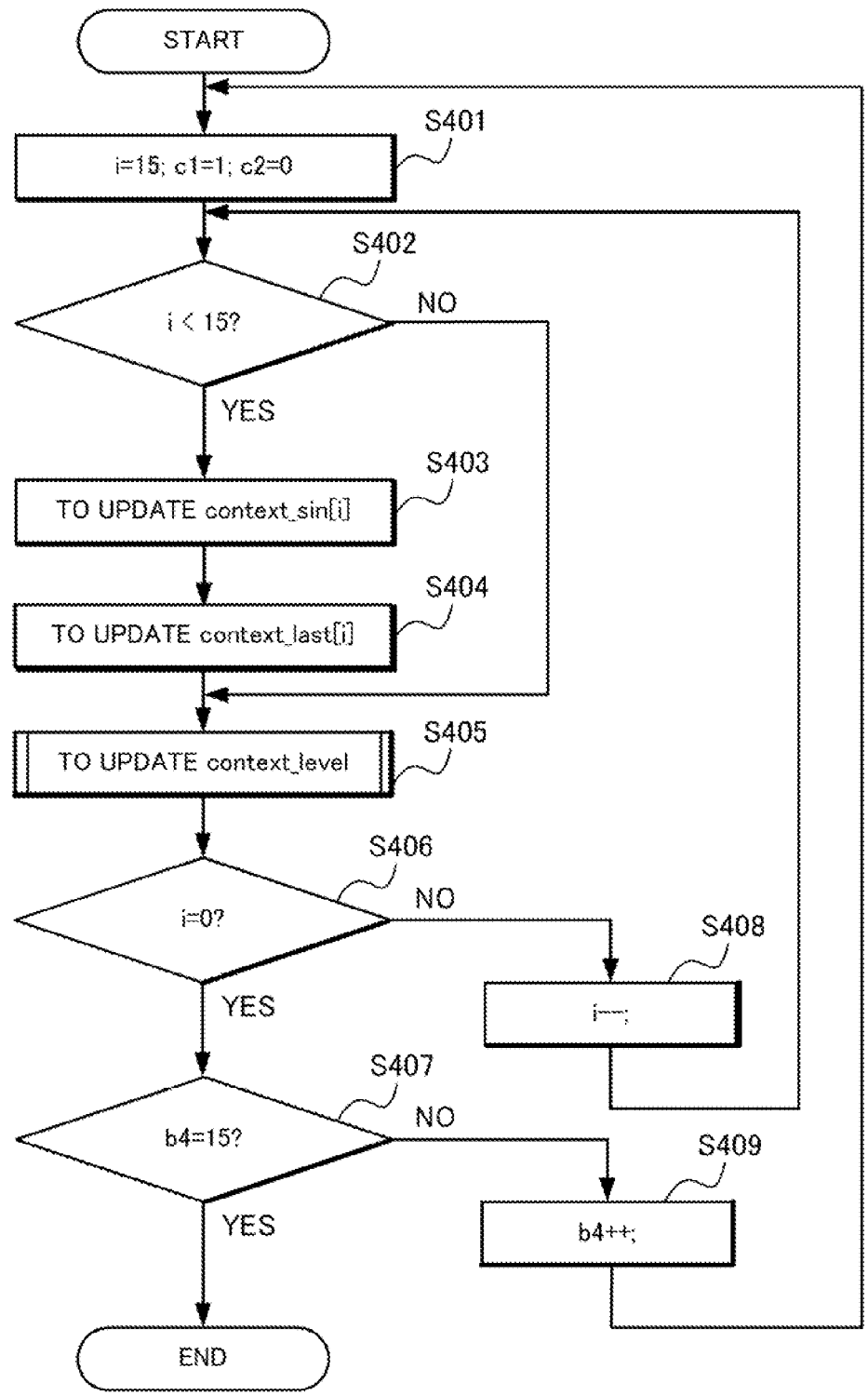
FIG. 6 is a flow chart showing how context-updating processing is executed by a context updating unit.

FIG. 6 shows how context updating processing is executed by the context updating unit. As to context updating, a device on the decoder side not shown fails to know a distribution of level values in each of 4×4 blocks when the video encoding device 300 as an encoder selects PCM coding. Therefore, assume that at the time of PCM encoding, in both an encoder and a decoder, significant level values are generated in every frequency component of all the 4×4 blocks.

At the start of context updating, set a 4×4 block index number "b4" to be "0". The 4×4 block index number here is a number of 4×4 block coding order in the macroblock shown in FIG. 18. For the simplification of the description, consideration will be given only to luminance pixels.

At Step S401, set the scan number "i" to be "15" and set "c1" as the number of successive level values whose absolute value is "1" to be "1". Also set "c2" as the number of successive level values whose absolute value is not less than "2" to be "0" and proceed to the subsequent Step S402. "c1" and "c2" are counted up to the maximum of four.

In the description of the subsequent Step S403 and the following steps, it should be noted in the first exemplary embodiment that from "i=15" of the highest frequency component of each of 4×4 blocks toward "i=0" of the direct component (DC), each context of "context_sig", "context_last" and "context_level_minus 1" corresponding to a level value of the "i" component is updated. Unlike ordinary direction execution made in ascending order from "i=0" to "i=15", this is executed in descending order.

The principle of simultaneous context updating of "context_sig" and "context_last" with "context_level_minus1" in descending order holds because the following conditions are satisfied.

(a) It is premised on that a significant level value occurs in every frequency component of all 4×4 blocks.

(b) "sig[i]" and "last[i]" have a context for each frequency component.

This enables the context "context_sig[i]" and "context_last[i]" to be similarly updated in both descending order processing from "i=15" to "i=0" and ascending order processing from "i=0" to "i=15" in an ordinary case.

At Step S402, for determining whether it is the highest frequency component or not, determination is made whether the scan number "i" is not more than 15. When it is not the highest frequency component, that is, when the scan number "i" is not more than 15 (Y), proceed to Step S403. When it is the highest frequency component and the scan number "i" is 15 or more, proceed to Step S405.

At Step S403, update the context "context_sig[i]" corresponding to "sig[i]" for the scan number "i" by using the following expression (2).

$$\text{context\_seg}[i] \cdot pStateidx = \begin{cases} transIdxLPS[\text{context\_sig}[i] \cdot pStateidx] \\ \quad \ldots \text{ if } (\text{context\_sig}[i] \cdot MPS = 0 \text{ AND context\_sin}[i] \cdot pStateidx > 0) \\ \text{context\_sig}[i] \cdot pStateidx \ldots \text{ otherwise.} \end{cases} \quad (2)$$

in which "context_sig[i]. pStateidx" is the least-probable-symbol occurrence probability state index of "context_sig[i]" and "context_sig[i]. MPS" is the most-probable-symbol of "context_sig[i]". "transIdxLPS[ ]" represents a state index transition table defined by the H.264 shown next in FIG. 7 and "transIdxLPS[x]" represents return of a value of "transIdxLPS" of a string corresponding to the value "x" of the "pStateidx" shown in FIG. 7.

FIG. 7 shows contents of the state index transition table. As is clear from FIG. 7, "transIdxLPS[x]" represents return of a value not more than the current "x".

Return to FIG. 6 to continue description. When the most-probable-symbol (MPS) is "0" because of update of "context_sig[i]" by using the Expression (2) at Step S403, "pStateidx" is updated to approximate to a smaller number. More specifically, update is executed such that least-probable-symbol occurrence probabilities of contexts for least-probable-symbols (LPS=1) will be higher than before. With this arrangement, even when binary symbols of "sig=1" as least-probable-symbols (LPS=1) are input in abundance by encoding of a macroblock subsequent to a PCM-coded macroblock, efficiency of binary arithmetic coding will be improved as much as an increase of the least-probable-symbol occurrence probability updated, that is, efficiency will be improved enough for coping with drastic changes in the symbol occurrence probabilities.

At next Step S404, update a context "context_last[i]" corresponding to "last[i] for the scan number "i" by the following Expression (3).

$$\text{context\_last}[i] \cdot pStateidx = \begin{cases} transIdxLPS[\text{context\_last}[i] \cdot pStateidx] \\ \quad \ldots \text{ if } (\text{context\_last}[i] \cdot MPS = 1 \text{ AND context\_last}[i] \cdot pStateidx > 0) \\ \text{context\_last}[i] \cdot pStateidx \ldots \text{ otherwise.} \end{cases} \quad (3)$$

in which "context_last[i]. pStateidx" is the least-probable-symbol occurrence probability state index of "context_last[i]" and "context_last[i].MPS" is the most-probable-symbol of "context_last[i]".

When the most-probable-symbol (MPS) is "1" because of update of "context_last[i]" by the Expression (3), "pStateidx" is updated to approximate to a smaller number. More specifically, update is executed such that least-probable-symbol occurrence probabilities of contexts for least-probable-symbols (LPS=0) will be higher than before. With this arrangement, even when binary symbols of "last=0" as least-probable-symbols (LPS=0) are input in abundance by encoding of a macroblock subsequent to a PCM-coded macroblock, efficiency of binary arithmetic coding will be improved as much as an increase of the least-probable-symbol occurrence probability updated, that is, efficiency will be improved enough for coping with drastic changes in the symbol occurrence probabilities.

At next Step S405, with the above-described number "c1" of successive level values whose absolute value is "1" set to be "1", on the basis of the number "c2" of successive level values whose absolute value is not less than 2 and the value "level_minus1[i]" obtained by subtracting "1" from an absolute value of the level value of the frequency component corresponding to the scan number "i", "context_level" is updated.

Figure 8:
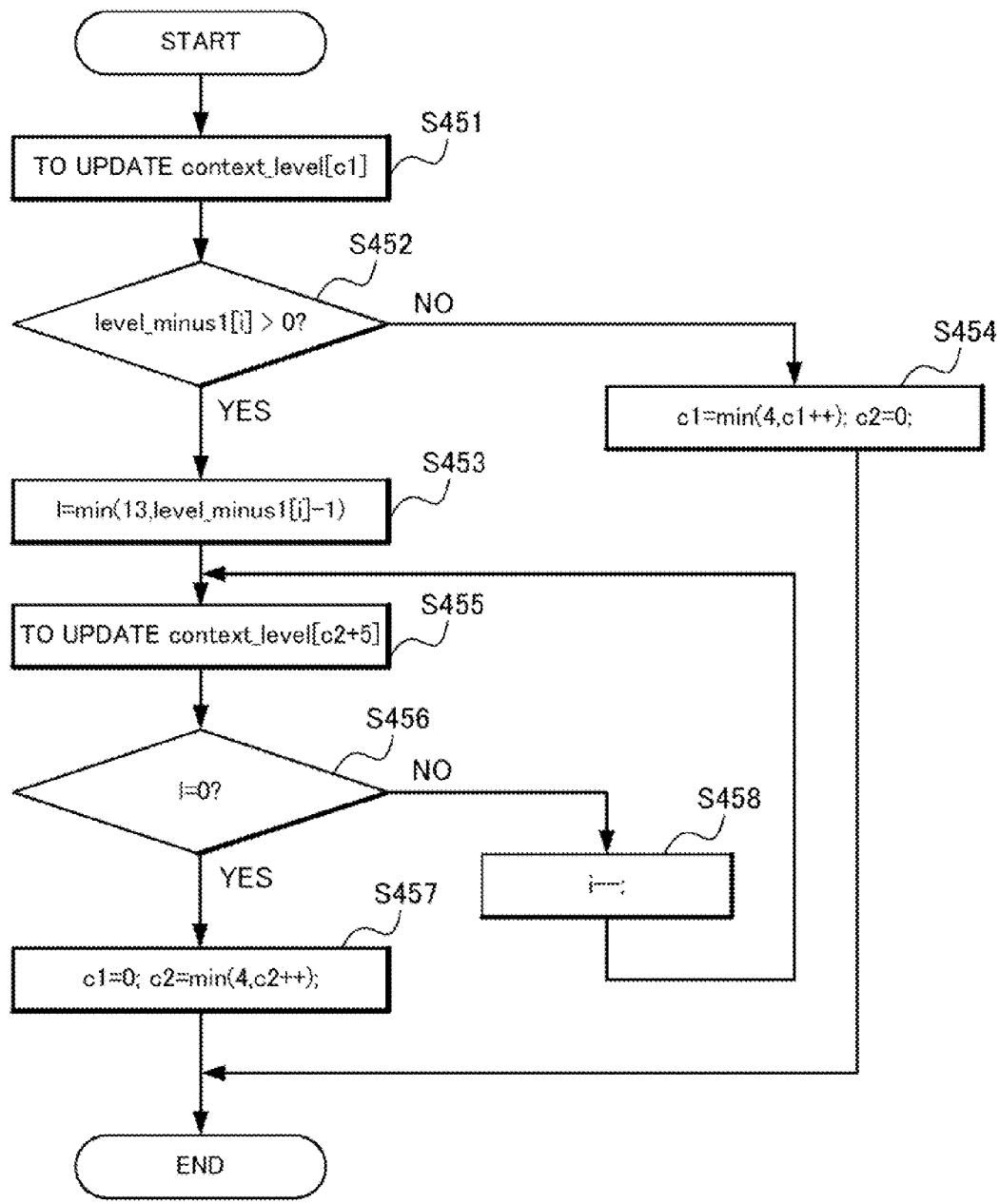
FIG. 8 is a diagram for use in explaining how updating processing of "context_level" described at Step S405 is executed.

FIG. 8 shows how updating processing of "context_level" is executed which is described in Step S405. In this processing, taken into consideration is that at the time of PCM coding, the decoder side is not allowed to find "level_minus1[i]" of each scan number "i" in each of 4×4 blocks when the encoder selects PCM coding. In other words, at the time of PCM coding, both the encoder and the decoder execute the processing shown in FIG. 8 assuming that "level_minus1[i]" of each scan number "i" in each of 4×4 blocks is "14".

First at Step S451, update the contexts "context_level[x]" corresponding to "x=C1" by the following Expression (4).

$$\text{context\_level}[x] \cdot pStateidx = \begin{cases} transIdxLPS[\text{context\_level}[x] \cdot pStateidx] \\ \quad \ldots \text{ if } (\text{context\_level}[x] \cdot MPS = 0 \text{ AND} \\ \quad \text{context\_level}[x] \cdot pStateidx > 0) \\ \text{context\_level}[x] \cdot pStateidx \ldots \text{ otherwise.} \end{cases} \quad (4)$$

in which context_level[x]. pStateidx" is the least-probable-symbol occurrence probability state index of "context_level[x]" and "context_level[x]. MPS" is the most-probable-symbol of "context_level[x]".

When the most-probable-symbol (MPS) is "0" because of update of "context_level[x]" by using the Expression (4), "pStateidx" is updated to approximate to a smaller number.

More specifically, update is executed such that least-probable-symbol occurrence probabilities of contexts for least-probable-symbols (LPS=1) will be higher than before. With this arrangement, even when a first binary symbol in a binary string of "level_minus1" of "bin=1" as a least-probable-symbol (LPS=1) is input in abundance by encoding of a macroblock subsequent to a PCM-coded macroblock, efficiency of binary arithmetic coding will be improved as much as an increase of the least-probable-symbol occurrence probability updated, that is, efficiency will be improved enough for coping with drastic changes in the symbol occurrence probabilities.

At the subsequent Step S452, determine whether "level_minus1[i]" is larger than "0" or not. When it is larger than "0"(Y), proceed to Step S453. When it is "0" (Step S452: N), proceed to Step S454. At Step S453, set the loop counter 1 by the following Expression (5).

$$l=\min(13, \text{level\_minus1}[i]-1) \quad (5),$$

in which "13" in the right side of the Expression (5) is a value taking into consideration that second to 14th bins of the binary string of "level_minus1[i]" use the same context and that 15th and the following bins use no context. Setting l to be a value larger than "13" means nothing.

In the processing at Step S455 which is executed subsequently to the processing of Step S453, update the context "context_level[x]" corresponding to "x=c2+5" by the Expression (4). Even when as a result of the updating of "context_level[x]" at Step S455, the second and the following binary symbols in a binary string of "level_minus1" of "bin=1" as a least-probable-symbol (LPS=1) are input in abundance by encoding of a macroblock subsequent to a PCM-coded macroblock, efficiency of binary arithmetic coding will be improved as much as an increase in updated least-probable-symbol occurrence probabilities, that is, efficiency will be improved enough for coping with drastic changes in the symbol occurrence probabilities.

Subsequently, proceed to Step S456. At Step S456, determine whether the loop counter 1 is "0" or not. When it is "0"(Y), proceed to Step S457. When it is not "0" (Step S456: N), proceed to Step S458 to decrement the loop counter 1 by one to return to Step S455.

$$c2=\min(4, c2++) \quad (6)$$

On the other hand, at Step S454, reset "c2" to "0" and furthermore update "c1" by the following Expression (7). Then, end the processing related to Step S405 in FIG. 6 (end).

$$c2=\min(4, c1++) \quad (7)$$

In the processing shown in FIG. 8, by switching the number "c1" of successive level values whose absolute value is "1" and the number "c2" of successive level values whose absolute value is not less than "2" as shown in the Expression (6) or (7), context modeling according to "level_minus1" processed in the past is executed.

Return to FIG. 6 to continue description. When the processing of Step S405 ends, the processing of Step S406 is executed. At Step S406, determine whether the scan number "i" is "0" or not. When it is "0" (Y), proceed to Step S407. This represents that the processing of the current 4×4 blocks is completed. Unless it is "0" (Step S406: N), proceed to Step S408 to decrement the scan number "i" by one and return to Step S402.

On the other hand, at Step S407, determine whether the 4×4 block index number "b4" is "15" or not. When it is "15" (Y), end the context update (end). Unless it is "15" (Step S407: N), proceed to Step S409 to increment the 4×4 block index number "b4" by "1" and return to Step S401. This represents proceeding to the processing of a subsequent 4×4 block in the macroblock.

As described in detail in the foregoing, the context updating unit 301 executes the context updating processing at the time of PCM selection. in the macroblock to be encoded after a PCM-coded macroblock this leads to update of the least-probable-symbol occurrence probability state index "pStateidx" of the context corresponding to each of "significant_coeff_flag", "last_significant_coeff_flag" and "coef_abs_level_minus1" so as to meet a binary symbol occurrence probability corresponding to each of significant_coeff_flag", "last_significant_coeff_flag" and "coef_abs_level_minus1" which are drastically changed.

More specifically, with respect to each context (context_sig[i], 0≤i≤14) of "significant_coeff_flag", when its most-probable-symbol (MPS) is "0", its "pStateidx" is updated to approximate to a smaller number. With respect to each context (context_last[i], 0≤i≤14) of "last_significant_coeff_flag", when its most-probable-symbol (MPS) is "1", its "pStateidx" is updated to approximate to a smaller number. Moreover, with respect to each context (context_level[c], 0≤C≤9) of "coef_abs_level_minums1", when its most-probable-symbol (MPS) is "0", its "pStateidx" is updated to approximate to a smaller number. In other words, the context updating unit 301 executes updating such that a least-probable-symbol occurrence probability of each of "context_sig[i]", "context_last[i]" and "context_level[c]" approximates to an equal probability. As a result, even when at the start of encoding of a subsequent macroblock, a binary symbol as a least-probable-symbol of a context different from a most-probable-symbol is input in abundance, efficiency of binary arithmetic coding can be improved as much as an increase in the least-probable-symbol occurrence probability updated.

Figure 9:
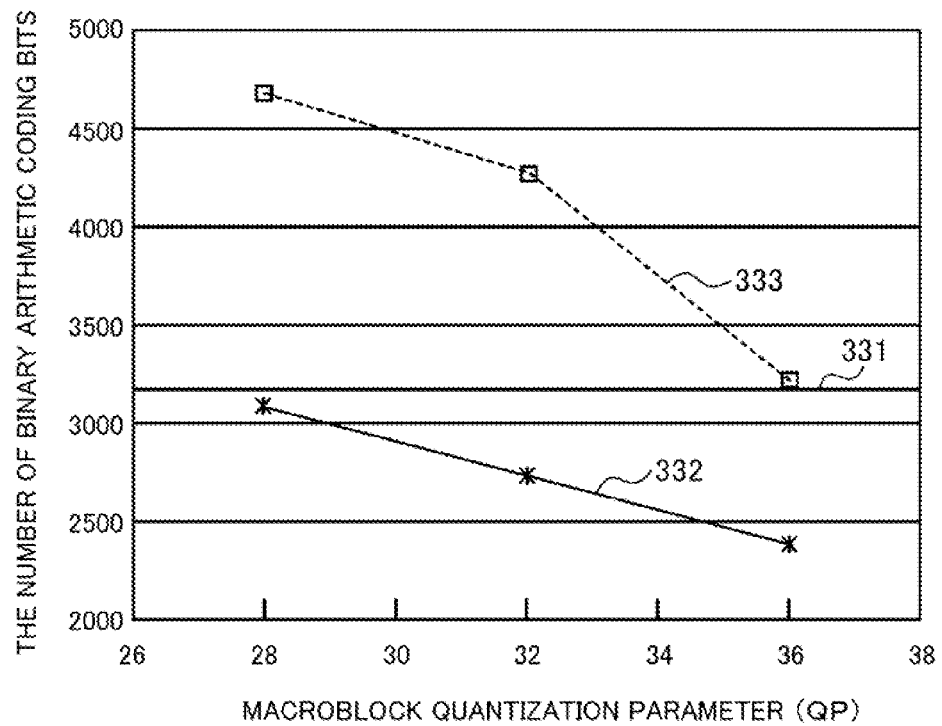
FIG. 9 is a characteristic diagram showing the effects obtained by the first exemplary embodiment in comparison with a device according to the related art.

FIG. 9 shows the effects attained by the first exemplary embodiment in comparison with those of the related art device. In this figure, a macroblock quantization parameter (QP) is represented by an abscissa and the number of binary arithmetic coding bits is represented by an ordinate. The macroblock quantization parameter (QP) is a value frequently used in an application using H.264.

Shown in this figure is a case where PCM coding is selected by input of a macroblock having significant level values in all frequency components after macroblocks having significant level values only in highest frequency components is subjected to binary arithmetic coding in succession. In other words, shown in the figure is the number of binary arithmetic coding bits in a macroblock having significant level values in all frequency components with respect to each macroblock quantization parameter (QP). The present exemplary embodiment is designed to update contexts when selecting PCM coding. As a result, because in the present exemplary embodiment, contexts are updated so as to meet drastically changed symbol occurrence probabilities, the number of bits of binary arithmetic coding is attained as indicated by a curve 332 without exceeding an upper limit value 331 which indicates the above-described predetermined number of bits.

In FIG. 9, the number of bits of binary arithmetic coding in a case where the video encoding device 100 (FIG. 17) as related art is used is represented by a curve 333 for reference. In a case where the video encoding device 100 as related art is used, no context update is executed when the PCM coding is selected. More specifically, since no context is updated to meet a drastically changed symbol occurrence probability in the video encoding device 100 as related art, the number of bits of binary arithmetic coding will exceed a predetermined number of bits. Comparison between the curves 332 and 333 finds that the present invention avoids a decrease in a coding efficiency of PCM coding caused by drastic changes in symbol occurrence probabilities.

(Modification Example of the First Exemplary Embodiment)

Figure 10:
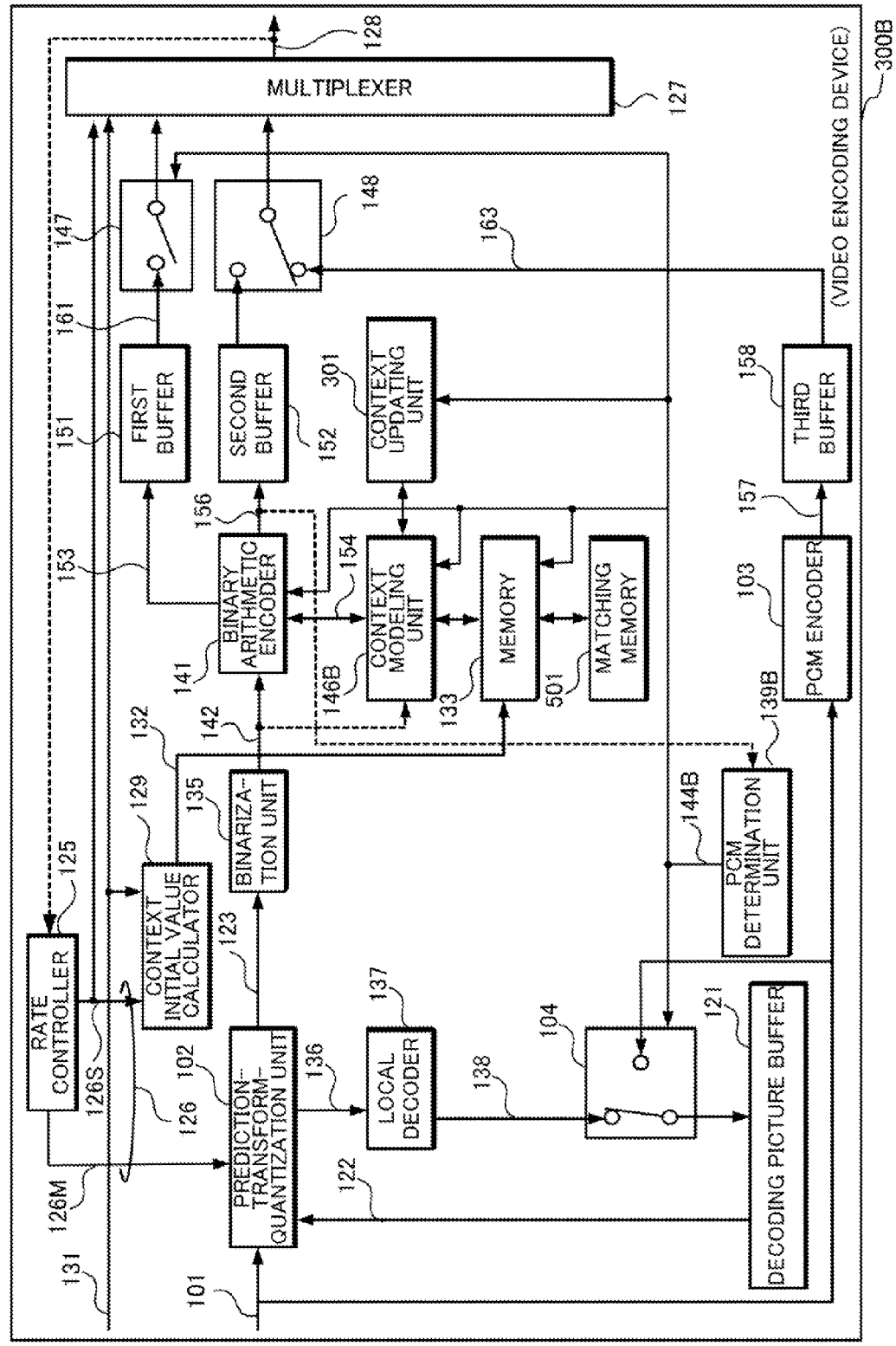
FIG. 10 is a block diagram showing a modification example of the video encoding device according to the first exemplary embodiment of the present invention.

FIG. 10 shows a modification example of the video encoding device according to the first exemplary embodiment of the present invention. In a video encoding device 300B shown in FIG. 10, the same parts as those of FIG. 1 are allotted the same reference numerals whose description will be appropriately omitted. The video encoding device 300B has the context updating unit 301 similarly to the video encoding device 300 shown in FIG. 1, in which a PCM determination unit 139B monitors not the coded data 123 but the number of bits as the bit output 156 of the binary arithmetic encoder 141 to determine whether the number of bits exceeds the above-described predetermined number of bins, thereby determining whether it is a PCM mode or not. Also in the video encoding device 300B, the memory 133 inputs/outputs data from/to a matching memory 501 as other memory.

Thus structured video encoding device 300B differs from the video encoding device 300 shown in FIG. 1 only in operation of the binary arithmetic encoder 141, the PCM determination unit 139B, the matching memory 501 and the context updating unit 301. Description will be therefore made mainly of the difference.

The binary arithmetic encoder 141, at a time point where a first bin of a macroblock is input, stores a state of the arithmetic encoder as of immediately before subjecting the first bin to binary arithmetic coding and holds the same in a local memory not shown in the binary arithmetic encoder 141. These stored and held contents are, for example, a range or a lower limit value of the binary arithmetic encoder 141. Unless signaled of selection of the PCM mode from the PCM determination unit 139B, the binary arithmetic encoder 141 constantly subjects a bin of a macroblock to binary arithmetic coding and outputs the obtained result to the second buffer 152.

Assume that when such processing is executed, a control signal 144B indicative of selection of the PCM mode is signaled to the binary arithmetic encoder 141 from the PCM determination unit 139B. At this time point, the binary arithmetic encoder 141 empties the second buffer 152. Then, store, in a current binary arithmetic encoder 141, a state of the immediately preceding bit output 156 which has been stored in the buffer.

Subsequently, subject a bin of a prediction parameter corresponding to the PCM mode to binary arithmetic coding based on contexts supplied from a context modeling unit 146B and output the obtained result to the first buffer 151. After subjecting the bin of the prediction parameter corresponding to the PCM mode to binary arithmetic coding, flush the range of the binary arithmetic encoder 141 as of that time point and output the obtained data to the first buffer 151. Lastly, by outputting as many bits of "0" as necessary, align bits of a bit string output to the first buffer 151. Bin of a prediction parameter corresponding to the PCM mode is a value determined uniquely. Therefore, the foregoing description is premised on that the binary arithmetic encoder 141 by itself generates the bin and subjects the same to binary arithmetic coding.

The PCM determination unit 139B monitors the number of bits of a macroblock output from the binary arithmetic encoder 141 to the second buffer 152. Then, at a time point where the number of bits exceeds the above-described predetermined number of bits, output the selection of the PCM mode to the control signal 144B. After outputting the selection of the PCM mode to the control signal 144B, upon completion of encoding of a current macroblock, the PCM determination unit 139B outputs non-selection of the PCM mode to the control signal 144B.

When a first bin of the macroblock is input, the matching memory 501 copies contexts of the memory 133 as of immediately before binary arithmetic coding of the first bin and holds the same until encoding of the subsequent macroblock is started. The matching memory 501, however, writes the previously copied contexts over the memory 133 at a time point where the selection of the PCM mode is signaled from the PCM determination unit 139B by the control signal 144B. This brings the context written over the memory 133 to coincide with contexts as of the end of coding of an immediately preceding macroblock to maintain matching of the context with the decoder.

When signaled of the selection of the PCM mode from the PCM determination unit 139B by the control signal 144B to write the contexts of the matching memory 501 over the memory 133, the context updating unit 301 updates contexts of coded data related to level values stored in the memory 133. In place of adopting such an updating procedure, before write of the contexts of the matching memory 501 over the memory 133, the context updating unit 301 may update contexts of coded data related to s stored in the contexts of the matching memory 501.

Thus, in the video encoding device 300B according to the modification example of the first exemplary embodiment, when a macroblock is PCM-coded due to drastic changes in symbol occurrence probabilities, only with the function of the context updating unit 301, contexts can be updated so as to coincide with the changed symbol occurrence probabilities. Since the matching memory 501 only holds contexts of an immediately preceding macroblock and holds contexts yet to be learned, when a macroblock is PCM-coded due to drastic changes in symbol occurrence probabilities, it is impossible to update contexts as to coincide with the drastically changed symbol occurrence probabilities.

(Second Exemplary Embodiment)

Figure 11:
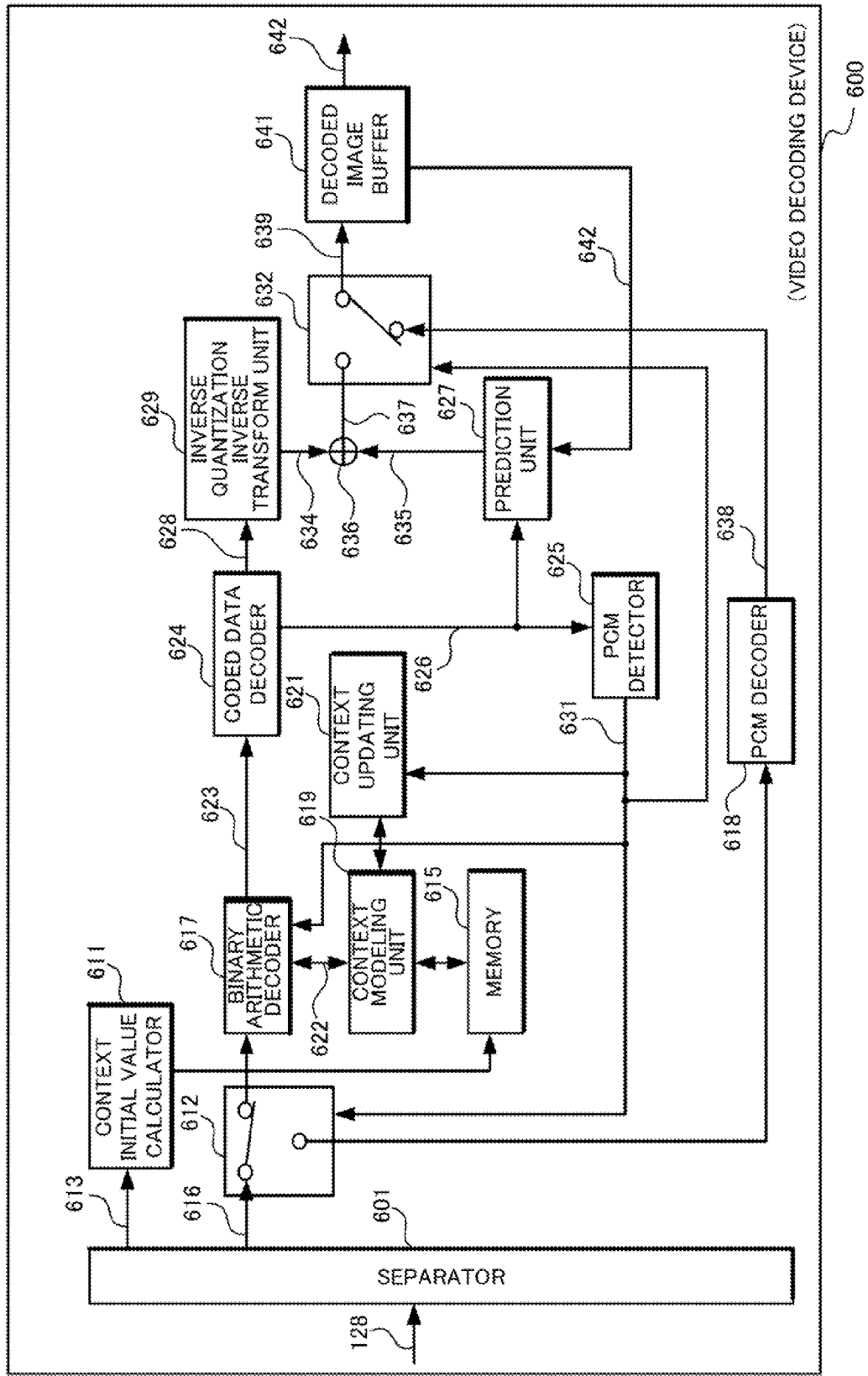
FIG. 11 is a block diagram showing a structure of a video encoding device according to a second exemplary embodiment of the present invention.

FIG. 11 shows a structure of a video decoding device according to a second exemplary embodiment of the present invention. A video decoding device 600 comprises a separator 601 for inputting the bit stream 128 output from the video encoding device 300 shown in FIG. 1. The separator 601 separates the bit stream 128 into slice header information and macroblock information. For more details, see "7 Syntax and semantics" in the above-described "ITU-T H.264 | ISO/IEC 14496-10 Advanced Video Coding". Header information of a slice corresponds to slice header syntax recited in the section 7.3.3. in the above-described "Advanced Video Coding". For macroblock information, see "macroblock layer syntax [muni]" recited in the section 7.3.5. in the above-described "Advanced Video Coding".

The separator 601 is connected to a context initial value calculator 611 and an input side of the fourth switch 612. From the separator 601 to the context initial value calculator 611, header information 613 of a slice formed of a slice quantization parameter and a model ID (model_id) is supplied. The context initial value calculator 611 is designed to calculate an initial value of contexts of binary arithmetic decoding based on the slice quantization parameter and the model ID to set a value 614 as a calculation result at a memory 615.

On the other hand, a bit 616 of macroblock information output from the separator 601 is supplied to a binary arithmetic decoder 617 or a PCM decoder 618 through the fourth switch 612. Between the binary arithmetic decoder 617 and the memory 615, a context modeling unit 619 is connected. In addition, the context modeling unit 619 is connected to a context updating unit 621. The binary arithmetic decoder 617 executes binary arithmetic decoding with respect to an input bit based on contexts 622 supplied from the context modeling unit 619. A binary symbol (bin) 623 decoded by the binary arithmetic decoder 617 is supplied to a coded data decoder 624.

The binary arithmetic decoder 617 is also connected to a PCM detector 625. The binary arithmetic decoder 617, when signaled from the PCM detector 625 that a current macroblock is in the PCM mode, resets a current range of the binary arithmetic decoder 617 to be a predetermined value. Then, the binary arithmetic decoder 617 stops binary arithmetic decoding until the current macroblock in the PCM mode has its decoding completed by the PCM decoder 618.

On the other hand, the coded data decoder 624 decodes original coded data from a binary string of the input bin 623. A prediction parameter 626 of the decoded coded data is supplied to the PCM detector 625 and a prediction unit 627 connected to the coded data decoder 624. A macroblock quantization parameter and a level value 628 of the decoded coded data are supplied to an inverse quantization inverse transform unit 629 connected to the coded data decoder 624.

The PCM detector 625 detects the current macroblock being in the PCM mode or not by the input prediction parameter 626. When the current macroblock is in the PCM mode, notify the binary arithmetic decoder 617, the context updating unit 621, the fourth switch 612 and a fifth switch 632 through its output control signal 631 that the current macroblock is in the PCM mode.

Prediction error image 634 and prediction image 635 as outputs of the inverse quantization inverse transform unit 629 and the prediction unit 627 are input to an adder 636 and added, so that a prediction decoded image 637 as a result of the addition is input to the fifth switch 632. The fifth switch 632 alternatively selects the prediction decoded image 637 and a PCM decoded image 638 as a decoding result of the PCM decoder 618 to input a selection output 639 to a decoded image buffer 641. A decoded image 642 output from the decoded image buffer 641 is input to the prediction unit 627 and output from the video decoding device 600 as a decoded image 642.

Here, out of the macroblock quantization parameter and the level value 628 input to the inverse quantization inverse transform unit 629, the level value is inversely quantized by a quantization step size corresponding to the macroblock quantization parameter. To the inversely quantized level values (transformed and quantized coefficients), inverse frequency transform is applied to return from the frequency domain to the space domain. The transformed and quantized coefficients returned to the space domain are the prediction error image 634.

The prediction error image 634 is input to one side of the adder 636. To the other side of the adder 636, the prediction image 635 generated by the prediction unit 627 is input. The latter predication image 635 is generated by receiving input of the prediction parameter 626 and the decoded image 642 output from the decoded image buffer 641 by the prediction unit 627. The prediction image 637 as a result of addition output from the adder 636 will be supplied to the fifth switch 632 as a decoded image of the macroblock.

When the control signal 631 output from the PCM detector 625 signals the PCM mode, the fourth switch 612 supplies the bit 616 of the macroblock information output from the separator 601 to the PCM decoder 618. The PCM decoder 618 executes PCM decoding with respect to the bit 616 of the macroblock information supplied when the current macroblock is in the PCM mode. The PCM decoded image 638 output as a result from the PCM decoder 618 will be supplied to the fifth switch 632 as a decoded image of the relevant macroblock.

The fourth switch 612, in an ordinary case, connects the output of the separator 601 to the input of the binary arithmetic decoder 617. When signaled by the control signal 631 from the PCM detector 625 that the current macroblock is in the PCM mode, the fourth switch 612 connects the output of the separator 601 to the input of the PCM decoder 618 until PCM decoding of the current macroblock is completed.

In an ordinary case described above, therefore, the fifth switch 632 supplies the prediction decoded image 637 to the decoded image buffer 641. When signaled by the PCM detector 625 that the current macroblock is the PCM mode, supply the PCM decoded image 638 to the decoded image buffer 641.

At a time point where the PCM detector 625 signals by the control signal 631 that the current macroblock is the PCM mode, the context updating unit 621 updates contexts of coded data related to the level values stored in the memory 615 through the context modeling unit 619. Coded data related to a level values in the second exemplary embodiment is, similarly to the first exemplary embodiment, "significant_coeff_flag", "last_significant_coeff_flag" and "coef_abs_level_minus1" in the H.264 standard.

The decoded image buffer 641 externally outputs the stored decoded image 642 at appropriate displaying timing.

In the foregoing described video decoding device 600 according to the second exemplary embodiment, the context updating unit 621 has crucial characteristics. Since operation of the context updating unit 621 is the same as that of the context updating unit 301 described in the first exemplary embodiment, no description will be made thereof.

The video decoding device 600 according to the second exemplary embodiment enables decoding of a coded bit stream which is generated by the video encoding device 300 according to the first exemplary embodiment. More specifically, when a macroblock is PCM-coded due to drastic changes in symbol occurrence probabilities, a coded bit stream can be decoded while applying context updating which meets the changed symbol occurrence probabilities.

(Third Exemplary Embodiment)

In the video encoding devices 300 and 300B as the first exemplary embodiment and its modification example shown in FIG. 1 and FIG. 10, when a macroblock is PCM-coded, the context updating unit 301 updates least-probable-symbol occurrence probability state indexes (pStateidx) of each context (context_sig[i], $0 \le i \le 14$) of "significant_coeff_flag", each context (context_last[i], $0 \le i \le 14$) of "last_significant_coeff_flag" and each context (context_level[c], $0 \le c \le 9$) of "coef_abs_level_minus1" to be a smaller number. In other words, the context updating unit 301 updates each least-probable-symbol occurrence probabilities of "context_sign[i]", "context_last[i]" and "context_level[c]" to be equal probabilities.

For the purpose of making least-probable-symbol occurrence probabilities of contexts be equal probabilities, however, such sequential update as in the first exemplary embodiment or its modification example is not required. In other words, it is only necessary to set most-probable-symbols (MPS) and least-probable-symbol occurrence probability state indexes (pStateidx) to be an appropriate value. More specifically, with respect to each "context_sig[i]", set MPS to be 1 and pStateidx to be 0, with respect to each "context_last[i]", set MPS to be 0 and pStateidx to be 0 and with respect to each "context_level[c]", set MPS to be 1 and pStateidx to be 0.

This setting is equivalent to setting most-probable-symbol occurrence probabilities be equal probabilities. In addition, setting least-probable-symbol occurrence probabilities of contexts to be equal probabilities results in that an output of binary arithmetic coding for one bin coded first by using the contexts in question will be one bit and reset at a state where no coding loss due to binary arithmetic coding occurs.

In the third exemplary embodiment of the present invention, each least-probable-symbol occurrence probabilities of "context_sig[i]", "context_last[i]" and "context_level[c]" is not sequentially updated to be equal probabilities but instantly updated to be equal probabilities.

Figure 12:
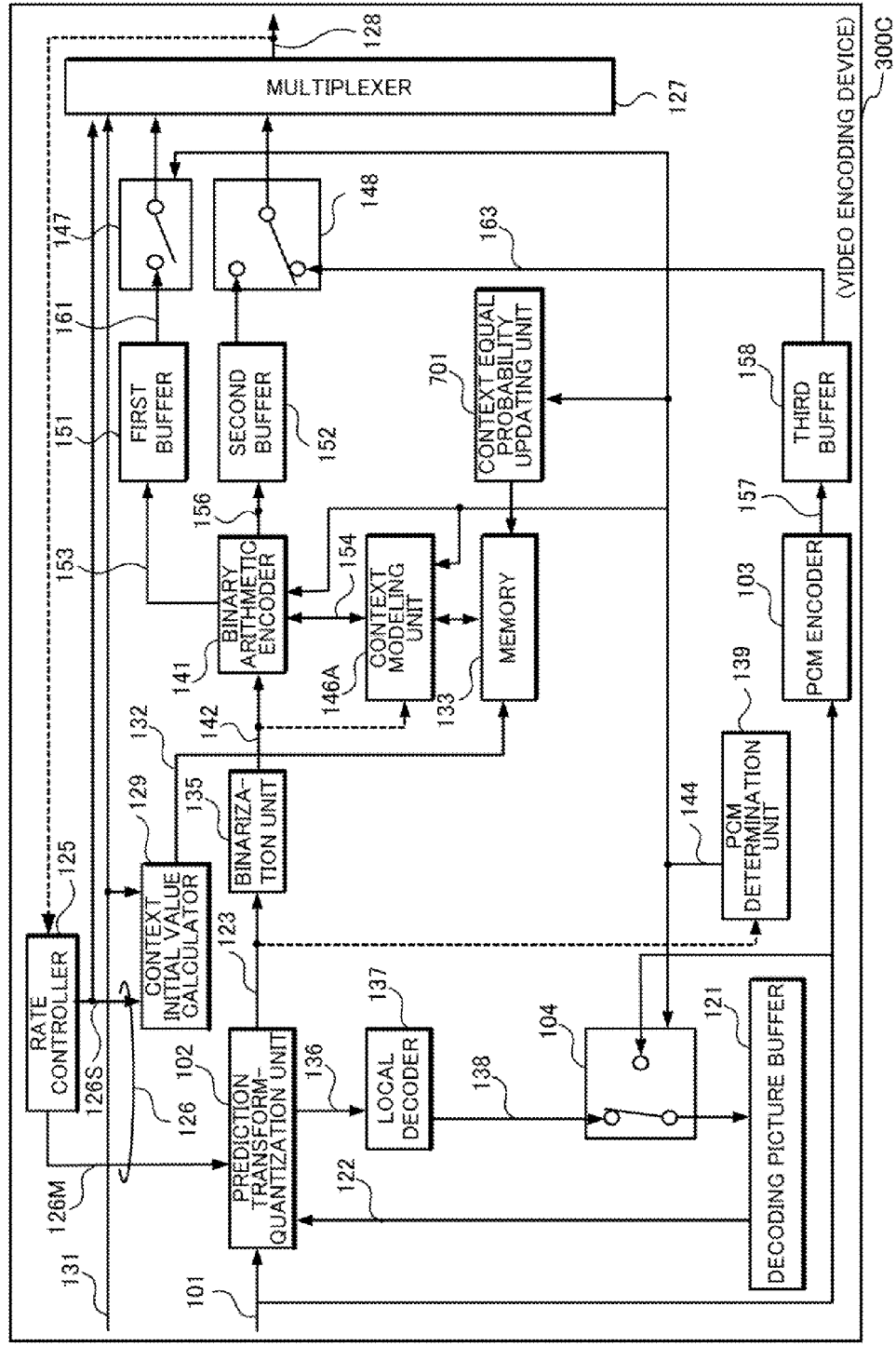
FIG. 12 is a block diagram showing a structure of a video encoding device according to a third exemplary embodiment of the present invention.

FIG. 12 shows a structure of a video encoding device according to the third exemplary embodiment of the present invention. In a video encoding device 300C of the third exemplary embodiment shown in FIG. 12, the same parts as those of FIG. 1 are allotted the same reference numerals whose description will be appropriately omitted. As compared with the video encoding device 300 of the first exemplary embodiment, the video encoding device 300C is provided with a context equal probability updating unit 701 in place of the context updating unit 301 existing in FIG. 1.

When signaled of PCM mode selection by the control signal 144 output from the PCM determination unit 139, the contexts equal probability updating unit 701 updates "context_sig[i]", "context_last[i]" and "context_level[c]" as contexts of coded data related to level values stored in the memory 133 to be the above-described values. In other words, set least-probable-symbol occurrence probabilities to be equal probabilities. Since direct update is executed with respect to data stored in the memory 133, the above-described updating processing by the context equal probability updating unit 701 is equivalent to the memory 133 overwriting processing.

In the video encoding device 300C of the third exemplary embodiment, the other parts than the context equal probability updating unit 701 are the same as those of the video encoding device 300 according to the first exemplary embodiment. Description will be here made only of operation of the context equal probability updating unit 701 at the time of PCM selection.

Figure 13:
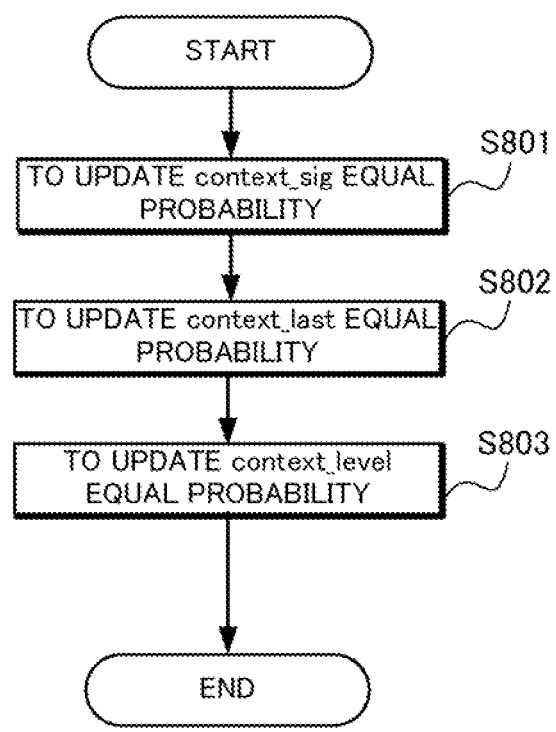
FIG. 13 is a flow chart showing a flow of processing by a context equal probability updating unit at the time of PCM selection.

FIG. 13 shows a flow of processing by the context equal probability updating unit at the time of PCM selection. First, in PCM selection, update occurrence probability state indexes (pStateidx) of all the "context_sig[i] (0≤i≤14) and a most-probable-symbol (MPS) by the following expressions (8) and (9) at Step S801.

$$\text{context\_sig[i].pStateidx}=0 \tag{8}$$

$$\text{context\_sig[i].MPS}=1 \tag{9}$$

By the Expression (8), the least-probable-symbol occurrence probabilities will be equal probabilities. Accordingly, even when the right side of the Expression (9) is not "1" but "0", an output of binary arithmetic coding for a first one bin coded using the relevant context will be one bit.

At next Step S802, update an occurrence probabilities state index (pStateidx) and a most-probable-symbol (MPS) of all the "context_last[i]" (0≤i≤14) by the following Expressions (10) and (11).

$$\text{context\_last[i]pStateidx}=0 \tag{10}$$

$$\text{context\_last[i]MPS}=1 \tag{11}$$

Similarly to "context_sig", because the least-probable-symbol occurrence probabilities will be equal probabilities by the Expression (10), even when the right side of the Expression (11) is not "0" but "1", an output of binary arithmetic coding for a first one bin coded using the relevant context will be one bit.

At next Step S803, update an occurrence probabilities state index (pStateidx) and a most-probable-symbol (MPS) of all the "context_level[c]" (0≤c≤9) by the following Expressions (12) and (13).

$$\text{context\_level[c]pStateidx}=0 \tag{12}$$

$$\text{context\_level[c]MPS}=1 \tag{13}$$

Similarly to "context_sig" and "context_last", because the least-probable-symbol occurrence probabilities will be equal probabilities by the Expression (8), even when the right side of the Expression (13) is not "1" but "0", an output of binary arithmetic coding for a first one bin coded using the relevant context will be one bit.

The foregoing processing completes update of contexts equal probabilities.

The above-described video encoding device 300C according to the third exemplary embodiment, when a macroblock is PCM-coded, enables not sequential context updating as in the first exemplary embodiment but instant context updating. It is accordingly possible to update contexts so as to meet drastically changed symbol occurrence probabilities by simpler arithmetic operation than that of the first exemplary embodiment.

(Modification Example of the Third Exemplary Embodiment)

Figure 14:
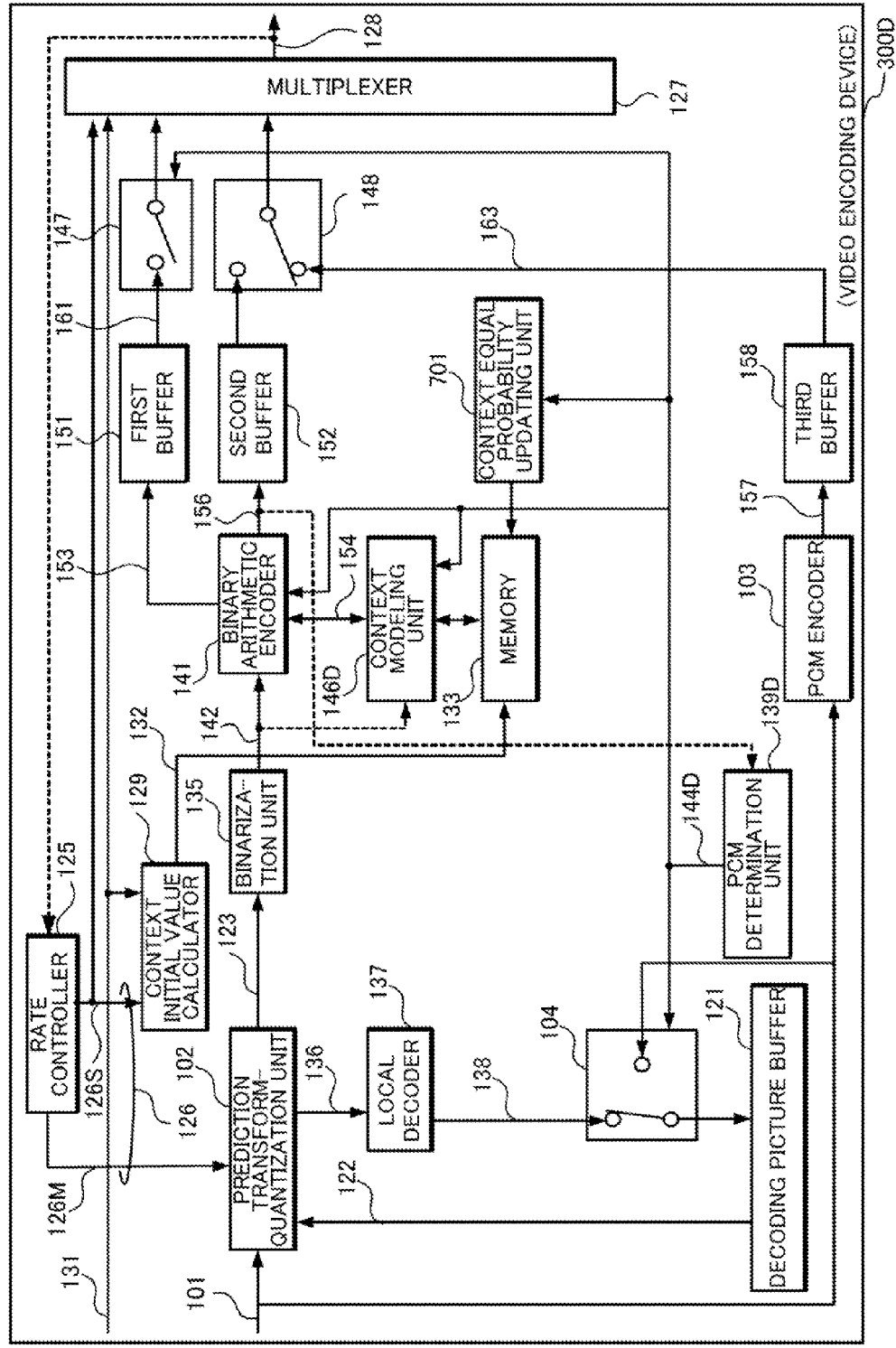
FIG. 14 is a block diagram showing a structure of a video encoding device as a modification example of the third exemplary embodiment of the present invention.

FIG. 14 shows a structure of a modification example of the video encoding device according to the third exemplary embodiment of the present invention. In a video encoding device 300D as a modification example of the third exemplary embodiment shown in FIG. 14, the same parts as those of FIG. 12 are allotted the same reference numerals whose description will be appropriately omitted. In the video encoding device 300D as the modification example, a PCM determination unit 139D is designed to monitor the number of bits as the bit output 156 of the binary arithmetic encoder 141 to determine whether the number of bits exceeds the above-described predetermined number of bins without monitoring the coded data 123, thereby determining whether it is in the PCM mode or not. This is the same as the relationship of the video encoding device 300B shown in FIG. 10 with the video encoding device 300 shown in FIG. 1.

Thus structured video encoding device 300D differs from the video encoding device 300 shown in FIG. 12 only in operation of the binary arithmetic encoder 141, the PCM determination unit 139D and a context modeling unit 146D. Description will be therefore made mainly of the difference.

The binary arithmetic encoder 141, at a time point where a first bin of a macroblock is input, stores a state of the arithmetic encoder as of immediately before subjecting the first bin to binary arithmetic coding and holds the same in a local memory not shown in the binary arithmetic encoder 141. These stored and held contents are, for example, a range or a lower limit value of the binary arithmetic encoder 141. Unless signaled of selection of the PCM mode from the PCM determination unit 139D, the binary arithmetic encoder 141 constantly subjects a bin of a macroblock to binary arithmetic coding and outputs the obtained result to the second buffer 152.

Assume that when such processing is executed, a control signal 144D indicative of selection of the PCM mode is signaled to the binary arithmetic encoder 141 from the PCM determination unit 139D. At this time point, the binary arithmetic encoder 141 empties the second buffer 152. Then, store, in a current binary arithmetic encoder 141, a state of the immediately preceding bit output 156 which has been stored in the buffer.

Subsequently, subject a bin of a prediction parameter corresponding to the PCM mode to binary arithmetic coding based on contexts supplied from the context modeling unit 146D and output the obtained result to the first buffer 151. After subjecting the bin of the prediction parameter corresponding to the PCM mode to binary arithmetic coding, flush the range of the binary arithmetic encoder 141 as of that time point and output the obtained data to the first buffer 151. Lastly, by outputting as many bits of "0" as necessary, align bits of a bit string output to the first buffer 151. Bin of a prediction parameter corresponding to the PCM mode is a value determined uniquely. Therefore, the foregoing description is premised on that the binary arithmetic encoder 141 by itself generates the bin and subjects the same to binary arithmetic coding.

Contexts used for bins of a prediction parameter corresponding to the PCM mode have as small as approximately three kinds in the H.264 standard. Therefore, the binary arithmetic encoder 141 is structured, when a first bin of a macroblock is input, to sequentially preserve by itself contexts as of immediately before the first bin is subjected to binary arithmetic coding. Then, upon signaling of selection of the PCM mode by the control signal 144D from the PCM determination unit 139D, the binary arithmetic encoder 141 writes the preserved contexts back to the memory 133 through the context modeling unit 146D.

The PCM determination unit 139D monitors the number of bits of a macroblock output from the binary arithmetic encoder 141 to the second buffer 152. Then, at a time point where the number of bits exceeds the above-described predetermined number of bits, output the selection of the PCM mode to the control signal 144D. After outputting the selection of the PCM mode to the control signal 144D, upon completion of coding of a current macroblock, the PCM determination unit 139D outputs non-selection of the PCM mode to the control signal 144D.

Compare the above-described video encoding device 300D as the modification example of the third exemplary embodiment with the video encoding device 300B as the modification example of the first exemplary embodiment shown in FIG. 10. It can be found that unlike the video encoding device 300B shown in FIG. 10, the matching memory 501 is unnecessary in the video encoding device 300D shown in FIG. 14. This is because when a macroblock is PCM-coded, only by writing the above-described predetermined value over a context ("context_sig[i]", "context_last[i]" and "context_level[c]") of coded data related to a level values stored in the memory 133 of the video encoding device 300D, the context is updated. In other words, the video encoding device 300D shown in FIG. 14 needs no sequential update based on contextstored in the matching memory 501 as is done in the structure of the video encoding device 300B shown in FIG. 10. The video encoding device 300D based on the context equal probability updating unit 701 which is shown in FIG. 14 accordingly has an advantage of having a simpler device structure.

(The Fourth Exemplary Embodiment)

Figure 15:
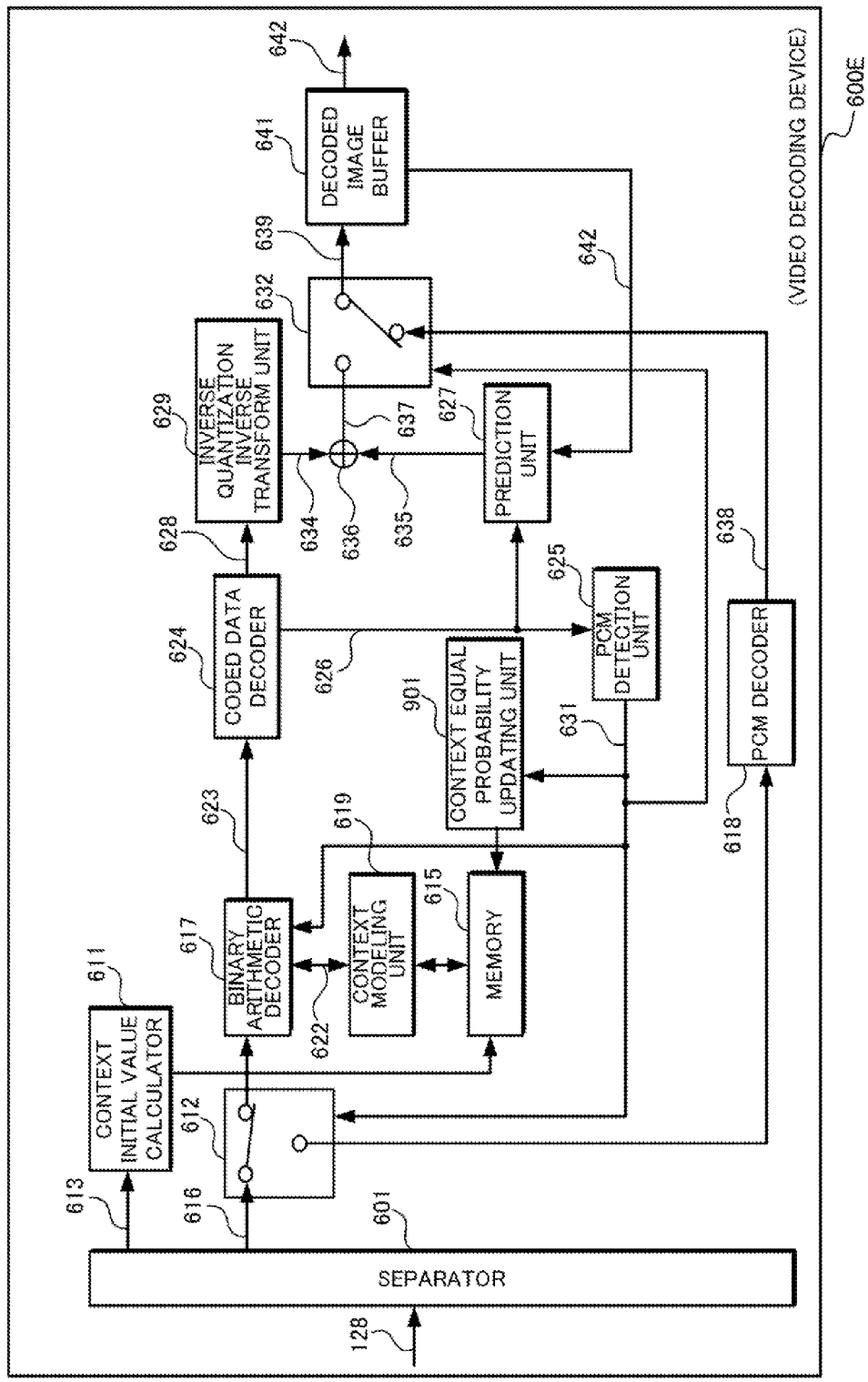
FIG. 15 is a block diagram showing a structure of a video decoding device according to a fourth exemplary embodiment of the present invention.

FIG. 15 shows a structure of a video decoding device according to a fourth exemplary embodiment of the present invention. In a video decoding device 600E shown in FIG. 15, the same parts as those of FIG. 11 are allotted the same reference numerals whose description will be appropriately omitted. In the video decoding device 600E according to the present exemplary embodiment, as compared with the video decoding device 600 shown in FIG. 11, a context equal probability updating unit 901 is provided in place of the context updating unit 621 (FIG. 11).

When signaled of the PCM mode by the PCM detection unit 625, the context equal probability updating unit 901 of the video decoding device 600E according to the fourth exemplary embodiment updates each least-probable-symbol occurrence probabilities of "context_sig[i]", "context_last[i]" and "context_level[c]" as-contexts of coded data related to level values stored in the memory 615 to an equal probabilities. Since data stored in the memory 133 is directly updated, the context equal probability updating unit 901 is equivalent to processing of writing over the memory 615.

Other circuit components than the context equal probability updating unit 901 in the video decoding device 600E are the same as those of the video decoding device 600 according to the second exemplary embodiment. The video decoding device 600E of the present exemplary embodiment enables decoding of a bit stream coded by the video encoding device 300C according to the third exemplary embodiment shown in FIG. 12. More specifically, with respect to a macroblock subjected to PCM coding due to drastic changes in symbol occurrence probabilities, a coded bit stream can be decoded while applying context equal probability updating which meets the changed symbol occurrence probabilities.

In the foregoing-described exemplary embodiments of the present invention, the description has been made of updating of contexts of "significant_coeff_flag", "last_significant_coeff_flag" and "coef_abs_level_minus1" in a case of PCM coding. It is apparent that the technical idea of the present invention is similarly applicable to Huffman coding in place of PCM coding or to a video processing device using binary arithmetic coding without using contexts.

In addition, although in the foregoing described exemplary embodiments of the present invention and the modification examples thereof, the description has been made of context updating of "significant_coeff_flag", "last_significant_coeff_flag" and "coef_abs_level_minus1" when 4×4 block-size frequency transform is used, they are not limited thereto. Also in video encoding decoding using 8×8 block-size frequency transform such as "High profile" of the H.264 standard, for example, similarly to a level values of an image block (4×4 frequency block) generated by 4×4 block-size frequency transform, binary arithmetic coding decoding is applied to a level values of an image block (8×8 frequency block) generated by 8×8 block-size frequency transform based on "significant_coeff_flag", "last_significant_coeff_flag" and "coef_abs_level_minus1". It is accordingly apparent that to such an 8×8 frequency block, the already described method of 4×4 frequency block context updating is applicable.

In this case, in the operation of the context updating unit 301 executed in the first exemplary embodiment and the second exemplary embodiment in an 8×8 frequency block, contexts of "significant_coeff_flag" and "last_significant_coeff_flag" are once updated in the order from a DC component to a high frequency component. Thereafter, in the order from a high frequency component to a DC component, update a context of "coef_abs_level_minus1". As to the context equal probability updating units 701 and 901 in the third exemplary embodiment and the fourth exemplary embodiment, change of the processing order is unnecessary.

Moreover, in each of the above-described exemplary embodiments of the present invention, in a case where MBAFF (Macroblock Adaptive Frame Field) coding as a picture coding structure is used, when updating contexts at the time of PCM coding, not only contexts of "significant_coeff_flag" and "last_significant_coeff_flag" of a coding structure (frame structure or a field structure) of a current macroblock but also "significant_coeff_flag" and "last_significant_coeff_flag" of other coding structure than that of a current macroblock may be updated at the same timing. For example, if a coding structure of a current macroblock is a frame structure, the contexts of a field structure is also updated. This avoids bias of a macroblock coding structure which is caused by context updating in the present invention.

Furthermore, in each of the exemplary embodiments of the present invention, whether to execute context updating at the time of PCM coding may be embedded in header information of a PCM mode macroblock. While this requires provision of a context update determination unit for determining whether to execute context update on the video encoder side, arithmetic coding is enabled which meets symbol occurrence probabilities in a macroblock succeeding a PCM mode macroblock.

The present invention may be also structured to update contexts only when a predetermined number of PCM mode macroblocks occur in succession in place of being embedded in header information of a PCM mode macroblock. This eliminates the need of a context update determination unit on the video encoder side.

While in each of the above-described exemplary embodiments, the video encoding device or the video decoding device is structured only with hardware, a CPU (Central Processing Unit) may execute a computer program and a part of constituent circuit devices may be realized as software.

Figure 16:
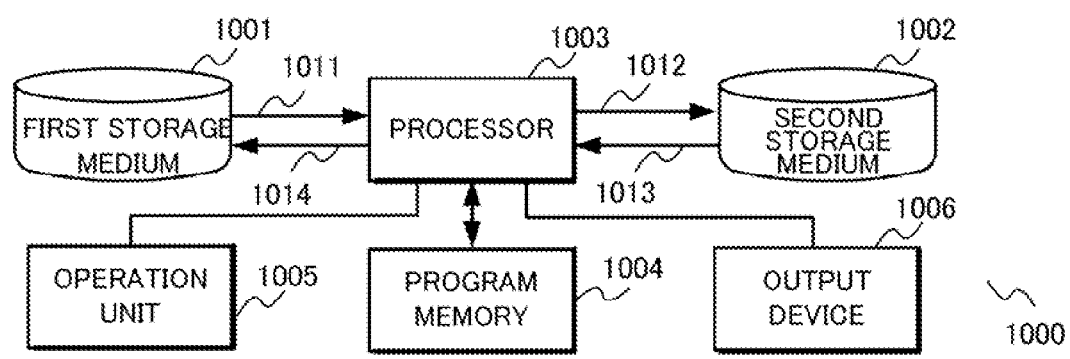
FIG. 16 is a schematic diagram of a structure of hardware when a video processing device comprising the video encoding device and the video decoding device according to the present invention is formed by software.

FIG. 16 shows a structure of hardware when a video processing device comprising a video encoding device and a video decoding device is formed by software as one example. A video processing device 1000 comprises a first storage medium 1001 for video data storage and a second storage medium 1002 for bit stream storage. The video processing device 1000 also comprises a processor 1003 with a CPU and a working memory not shown stacked as a semiconductor chip and is connected to a program memory 1004 which stores a control program to be executed by the CPU. Connected to the processor 1003 are an operation unit 1005 for a user or a person in charge of maintenance to operate the video processing device 1000, and an output device 1006 for displaying or printing out a state of operation or various kinds of information about video or the like as of before coding or after decoding.

The processor 1003 reads video data 1011 from the first storage medium 1001 and encodes the same to store a bit stream 1012 in the second storage medium 1002. Also read a bit stream 1013 from the second storage medium 1002 and decode the same into video data 1014 to store obtained data in the first storage medium 1001. By the execution of the control processor by the CPU, the processor 1003 here realizes various kinds of circuit devices virtually described in each of the above-described exemplary embodiments.

It is apparent that a part or all of the first storage medium 1001, the second storage medium 1002 or the program memory 1004 can be arranged on a network not shown such as the Internet.

Although the present invention has been described with respect to the preferred exemplary embodiments (and examples) in the foregoing, the present invention is not necessarily limited to the above-described exemplary embodiments (and examples). Structure or details of the present invention allow various modifications that those skilled in the art can understand without departing from the scope of the present invention.

What is claimed is:

1. A video encoding device, comprising:
a first encoding unit for subjecting transformed and quantized values which are obtained by applying frequency-transform and quantization to an image block, to binary arithmetic coding which is entropy coding based on contexts, and updating said contexts based on data of being target to encode;
a second encoding unit for encoding said image block by an encoding method which is different from the method of said first encoding unit and is non-entropy encoding;
an output data selection unit for selecting either first output data output by said first encoding unit or second output data output by said second encoding unit; and
a context updating unit for, when the output data selection unit selects said second output data encoded by the non-entropy coding, updating said contexts for use in the binary arithmetic coding of said transformed and quantized values by increasing least-probable-symbol occurrence probabilities of said contexts with respect to least-probable-symbol so that symbol occurrence probabilities of the context coincide occurrence probabilities of bin, which is the least-probable-symbol, in the coded data before the next entropy coding being execute.

2. The video encoding device according to claim 1, wherein said context updating unit is a unit which updates contexts for use in the binary arithmetic coding of said transformed and quantized values so as to decrease the number of contexts associated with low least-probable-symbol occurrence probabilities.

3. The video encoding device according to claim 1, wherein said context updating unit is a unit which increases occurrence probabilities of least-probable-symbols of contexts for use in the binary arithmetic coding of said transformed and quantized values.

4. The video encoding device according to claim 1, wherein said context updating unit is a unit which writes contexts associated with predetermined certain values of symbol occurrence probabilities over contexts for use in the binary arithmetic coding of said transformed and quantized values.

5. The video encoding device according to claim 4, wherein said predetermined certain values of symbol occurrence probabilities are the value of equal probability.

6. The video encoding device according to claim 1, wherein the encoding method different from the method of said first encoding unit is PCM coding.

7. A video encoding method, comprising:
a first encoding step of subjecting transformed and quantized values which are obtained by applying frequency-transform and quantization to an image block to binary arithmetic coding which is entropy coding based on contexts, and updating said contexts based on data of being target to encode;

a second encoding step of encoding said image block by an encoding method which is different from the method of said first encoding step and is non-entropy encoding;

an output data selection step of selecting either first output data output at said first encoding step or second output data output at said second encoding step; and a context updating step of, when at the output data selection step, said second output data encoded by the non-entropy coding is selected, updating said contexts for use in the binary arithmetic coding of said transformed and quantized values by increasing least-probable-symbol occurrence probabilities of said contexts with respect to least-probable-symbol so that symbol occurrence probabilities of the context coincide occurrence probabilities of bin, which is the least-probable-symbol, in the coded data before the next entropy coding being execute.

8. The video encoding method according to claim 7, wherein the coding method different from the method of said first encoding step is PCM coding.

9. The video encoding method according to claim 7, wherein at said context updating step, updating contexts for use in the binary arithmetic coding of said transformed and quantized values so as to decrease the number of contexts having low least-probable-symbol occurrence probabilities.

10. The video encoding method according to claim 7, wherein at said context updating step, increasing occurrence probabilities of least-probable-symbols of contexts for use in the binary arithmetic coding of said transformed and quantized values.

11. The video encoding method according to claim 7, wherein at said context updating step, writing contexts associated with predetermined certain values of symbol occurrence probabilities over contexts for use in the binary arithmetic coding of said transformed and quantized values.

12. The video encoding method according to claim 11, wherein said predetermined certain values of symbol occurrence probabilities are the value of equal probability.

13. The video encoding device according to claim 1, wherein said context updating unit updates contexts for use in the binary arithmetic coding of said transformed and quantized values by setting most-probable-symbol occurrence probabilities of contexts to low probability.

14. The video encoding method according to claim 7, wherein at said context updating step, updating contexts for use in the binary arithmetic coding of said transformed and quantized values is by setting most-probable-symbol occurrence probabilities of contexts to low probability.

* * * * *